US011211646B2

(12) United States Patent
Eberleh et al.

(10) Patent No.: US 11,211,646 B2
(45) Date of Patent: Dec. 28, 2021

(54) BATTERY MODULE

(71) Applicant: AKASOL GMBH, Darmstadt (DE)

(72) Inventors: Bjoern Eberleh, Alsbach-Hahnlein (DE); Stephen Raiser, Wiesbaden (DE); Felix Von Borck, Darmstadt (DE)

(73) Assignee: AKASOL AG, Darmstadt (DE)

( * ) Notice: Subject to any disclaimer, the term of this patent is extended or adjusted under 35 U.S.C. 154(b) by 689 days.

(21) Appl. No.: 15/103,487

(22) PCT Filed: Dec. 10, 2014

(86) PCT No.: PCT/EP2014/077193
§ 371 (c)(1),
(2) Date: Aug. 24, 2016

(87) PCT Pub. No.: WO2015/086670
PCT Pub. Date: Jun. 18, 2015

(65) Prior Publication Data
US 2016/0359206 A1    Dec. 8, 2016

(30) Foreign Application Priority Data

Dec. 10, 2013   (DE) .................. 10 2013 113 799.7

(51) Int. Cl.
| | |
|---|---|
| *H01M 10/656* | (2014.01) |
| *H01M 2/20* | (2006.01) |
| *H01M 8/24* | (2016.01) |
| *H01M 10/613* | (2014.01) |
| *H01M 10/04* | (2006.01) |
| *H01M 10/0525* | (2010.01) |
| *H01M 10/48* | (2006.01) |

(Continued)

(52) U.S. Cl.
CPC ..... *H01M 10/613* (2015.04); *H01M 10/0481* (2013.01); *H01M 10/0525* (2013.01); *H01M 10/425* (2013.01); *H01M 10/4257* (2013.01); *H01M 10/48* (2013.01); *H01M 10/486* (2013.01); *H01M 10/647* (2015.04);

(Continued)

(58) Field of Classification Search
None
See application file for complete search history.

(56) References Cited

U.S. PATENT DOCUMENTS 6,063,520 A *  5/2000  Fauteux ............. H01M 2/0207
                                                  429/163
8,252,452 B2 *  8/2012  Yoon ..................... H01M 2/021
                                                  429/122

(Continued)

FOREIGN PATENT DOCUMENTS

| DE | 102009052508 A1 | 5/2011 |
|---|---|---|
| DE | 102009058861 A1 | 6/2011 |

(Continued)

*Primary Examiner* — Cynthia H Kelly
*Assistant Examiner* — Julian Anthony
(74) *Attorney, Agent, or Firm* — Vivacqua Crane PLLC

(57) ABSTRACT

The present invention relates to a battery module consisting of battery cells and a cooling module comprising multiple tiers, the cooling module being designed to hold the battery cells, such as lithium-ion batteries. The cooling module consists of at least one first and one second side part, each side part having at least one flow channel, and of multiple substantially flat elements which extend along planes between the side parts. An internal area is formed between neighbouring flat elements, said internal areas being designed to hold the battery cells.

18 Claims, 15 Drawing Sheets

Figure 1A:
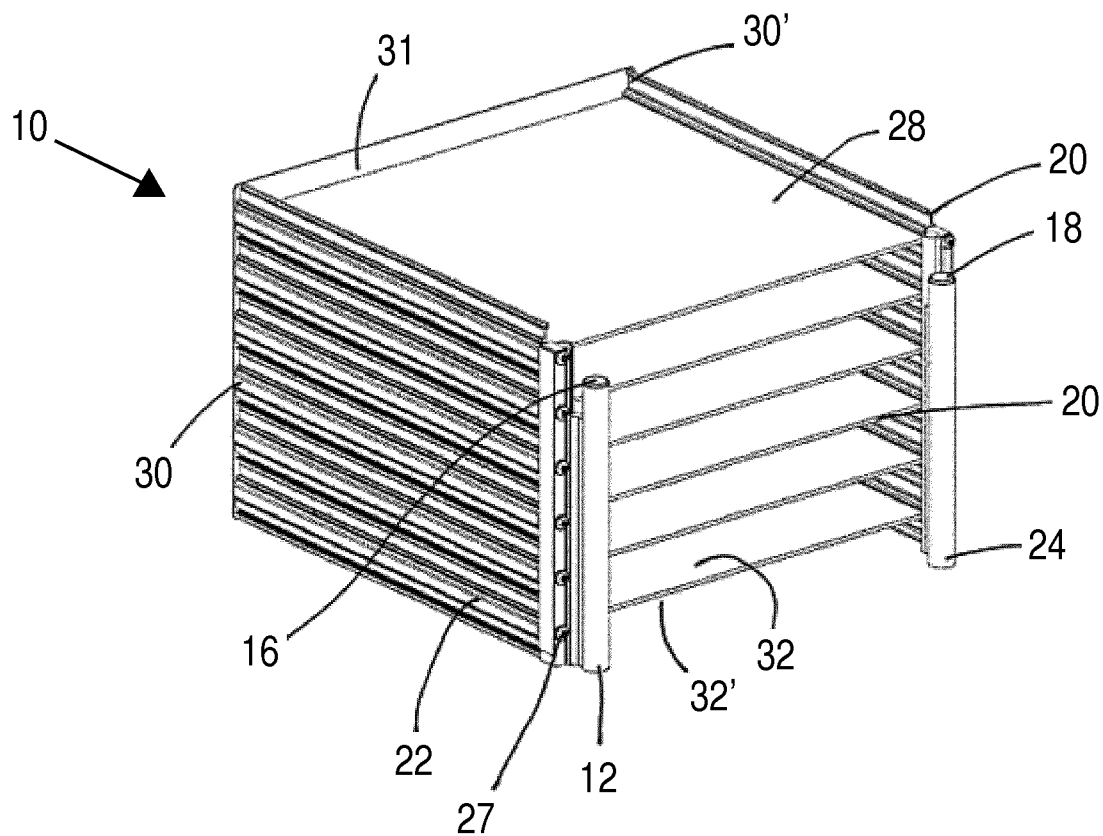

(51) Int. Cl.

| | | |
|---|---|---|
| *H01M 10/653* | (2014.01) | |
| *H01M 10/647* | (2014.01) | |
| *H01M 10/6556* | (2014.01) | |
| *H01M 10/6555* | (2014.01) | |
| *H01M 10/42* | (2006.01) | |
| *H01M 50/20* | (2021.01) | |
| *H01M 50/411* | (2021.01) | |
| *H01M 50/463* | (2021.01) | |

(52) U.S. Cl.
CPC ..... *H01M 10/653* (2015.04); *H01M 10/6555* (2015.04); *H01M 10/6556* (2015.04); *H01M 50/20* (2021.01); *H01M 50/411* (2021.01); *H01M 50/463* (2021.01); *H01M 2010/4271* (2013.01); *H01M 2200/00* (2013.01); *H01M 2200/10* (2013.01); *H01M 2250/20* (2013.01); *Y02E 60/10* (2013.01); *Y02P 70/50* (2015.11); *Y02T 90/40* (2013.01)

(56) References Cited

U.S. PATENT DOCUMENTS

| | | | |
|---|---|---|---|
| 2003/0122527 A1* | 7/2003 | Yugo | H01M 10/443 320/150 |
| 2008/0057392 A1 | 3/2008 | Takamatsu et al. | |
| 2009/0255109 A1* | 10/2009 | Weber | H01M 2/14 29/623.2 |
| 2011/0027630 A1* | 2/2011 | Tsutsumi | H01M 2/024 429/53 |
| 2011/0162820 A1 | 7/2011 | Weber et al. | |
| 2012/0003508 A1 | 1/2012 | Narbonne et al. | |
| 2012/0219839 A1 | 8/2012 | Freudenberg | |
| 2013/0157099 A1 | 6/2013 | Anderson | |
| 2013/0216887 A1* | 8/2013 | Wayne | H01M 2/1061 429/120 |
| 2014/0131015 A1* | 5/2014 | Hsu | F28F 13/12 165/109.1 |
| 2015/0037662 A1* | 2/2015 | Pinon | H01M 2/0237 429/179 |

FOREIGN PATENT DOCUMENTS

| | | |
|---|---|---|
| DE | 202010015854 U1 | 4/2012 |
| EP | 2403050 A1 | 1/2012 |
| JP | 2003303579 A1 | 10/2003 |
| WO | 2010121829 A1 | 10/2010 |
| WO | 2010121831 A1 | 10/2010 |
| WO | 2011101391 A1 | 8/2011 |
| WO | 2012028298 A2 | 3/2012 |
| WO | 2013156554 A1 | 10/2013 |

\* cited by examiner

SECTION B - B

SECTION D - D

SECTION E - E

BATTERY MODULE

The present invention relates to a battery module composed of battery cells and a cooling module having a plurality of tiers, wherein the cooling module is configured for the reception of battery cells, such as e.g. lithium ion batteries, wherein the cooling module is composed of at least one first and one second side part each having at least one flow passage, as well as of a plurality of planar elements which extend in an essentially planar manner between the side parts, wherein an inner space is formed between the adjacent planar elements and the spaces are configured for the reception of the battery cells.

In the PCT application of the Akasol GmbH having the official publication number WO 2012/028298, a battery module of the initially named kind is described that is used for the formation of an electric vehicle battery and/or of an electric vehicle battery module for vehicles with an electric drive train. By means of the modular assembly of a battery module it can also be used for different purposes, e.g. for stationary applications or for small drive applications, such as, for example in a wheelchair. In this document the battery module is assembled from a plurality of tier like elements.

Moreover, a further battery module of the initially named kind is described in WO 2010/121831. In this document the cooling module is composed of a one-part cooling module having two oppositely disposed cooled sides between which the sheet metal cooling plates extend and that in this respect form a plurality of spaces stacked on top of one another for the reception of the battery cells in such a way that a cooling module is also present in this respect having a plurality of tiers.

Cooling modules that are mounted with a plurality of battery cells form battery modules.

A battery module system that is assembled from a plurality of like battery modules can, for example, be configured in order to cover a power range having a content of energy of between 1 kWh and 400 kWh or more. If, for example, a battery module system is designed for a continuous power of 20 kW, peak powers of, for example 100 kW, could intermittently be required from the battery for the purpose of acceleration, whereby excellent acceleration values can be achieved. In the charging mode of operation one can, for example, work with a charging power of 40 kW.

The above illustrated values are to be understood purely by way of example, with the values, on the other hand, nevertheless representing values that can indeed be achieved with commercially available lithium ion batteries.

The first mentioned PCT application having the official publication number WO 2012/028298 is based on the object of providing a method for the manufacture of a modular cooling module respectively of providing an alternative construction of a modular cooling module that likewise permit/permits an excellent heat exchange between the battery cells and the coolant. Furthermore, an extremely rational method of manufacture should also be ensured having regard to the design of the cooling module that can be carried out with a very low demand in material and at low economic cost. The battery module should be of compact design and be configured in a thermally ideal manner and in particular be designed in such a way that the operating temperature of the battery module and/or of the battery module system can be maintained within narrow boundaries in order to avoid the local overheating of individual cells, to avoid increased temperatures of one or more cells or to avoid the operation at too low cell temperatures, if possible.

In order to satisfy this object, a cooling module for a battery module composed of one or more cells is provided in the mentioned PCT application, wherein the cooling module has the shape of a body having an inner space for the reception of battery cells, wherein the body has one or more cooling passages extending in parallel to one another between an inlet region and an outlet region and is formed at least partly from a length or a plurality of lengths of a hollow section. Sheet metal cooling plates are inserted between the lateral hollow sections of the cooling module in order to form spaces for the reception of the battery cells and to conduct heat away from the cells. Rather than using sheet metal cooling plates, one can also work with cooling wings that laterally project inwardly at the side from the used hollow sections into the interior of the cooling module and likewise form spaces for the reception of the battery cells.

The operating temperature of the individual battery cells should normally not exceed a working range of e.g. 18° C. to 25° C., as otherwise the lifetime of the individual battery cells of a battery module can at least in part be drastically reduced. The fact that the side parts of the cooling module formed by sheet metal cooling plates in previous cooling modules were typically provided with cooling circuits in order to realize the cooling of the battery cells, could lead to problems with the cooling, as the dissipation of heat from the interior of the cells to the coolant cannot always be sufficiently ensured.

The present invention is based on the object of creating a battery module of the initially mentioned kind which enables an ideal operation of the cooling module and in this way a thereby made available battery module that can be produced also in a rational manner and creates a qualitatively high value product.

This object is satisfied by a battery module in accordance with one of the claims 1, 18 and 19.

Fire protective means are provided in a battery module in accordance with the invention. These enable the compartmentalization of individual battery cells with respect to one another that can be present in a cooling module and in this way prevent a spreading of a cell fire between adjacent battery cells. Furthermore, fire protective means permit the protection of electrical and/or electronic components, e.g. of a battery management system or also of a cooling line by means of which cooling liquid is transported to the cooling module. This also enables a continuous cooling and/or control/regulation of the battery module albeit a fire of a battery cell.

The containment of the fire by means of the fire protective means contributes towards the solution of restoring the battery module by means of exchange of the defective components.

Preferably the fire protective means are arranged in the region of the planar elements, preferably in the region between the planar elements and the battery cells and/or the fire protective means are provided between cooling wings of an extruded section forming a tier, with the extruded section defining the side parts and the flow passages of the tier and/or the fire protective means in particular being sheet-like fire protective means. Such an arrangement improves the containment of the spreading of a cell fire and/or of the battery management system.

Typically the fire protective means foam up on an influence of temperature and preferably comprise a fire protective means on the basis of an expandable graphite, wherein the fire protective means are in particular arranged in the region of the planar elements.

Such materials foam up following a reaction induced by an influence of temperature at a pressure of at least three, preferably of at least four bar, at a temperature of 300° C. The reaction first takes place at temperatures of above 100° C., preferably first at temperatures of above 200° C. in such a way that it can be ensured that the materials only foam up for a fire.

Such a fire protective means which is preferably arranged in the region of the planar elements and in particular between battery cells forms a continuous soft mass in the case of fire that protects the adjacently arranged battery cells from an attack by fire. Furthermore, an ever increasing temperature leads to a further increase in size of the foaming body mass and in this way generally prevents a transfer of fire between individual battery cells and/or between battery cells that are arranged in individual compartments of a cooling module. Such fire protective materials are distributed e.g. using the tradenames Kerafix® Flexting 100 and ROCU® Strip F 115 respectively.

Having regard to a further aspect in accordance with the invention damping means are provided. Hereby the battery cells can be accommodated more densely and/or more securely in the battery module. Thus, the battery cells cannot be moved relative to one another, in this way they are also protected better with respect to external impact forces and vibrations that can arise during a driving mode of operation and mechanical loads are more uniformly distributed in the battery module.

In accordance with an advantageous embodiment the damping means are arranged in the region of the spaces for the reception of the battery cells, preferably between adjacent battery cells and at the outer side of the uppermost and the lowermost battery cell of the module, with the damping means preferably being sheet-like damping means and optionally being composed of foam. Hereby a damping between individual battery cells or pairs of battery cells can be provided in a large area manner in order to ensure an even more uniform distribution of the loads arising during operation.

Preferably the damping means are composed of a foam and are arranged in a planar manner at individual battery cells in order to preload these with a predefined force. Optionally, such a foam insert can also be attached at the uppermost and lowermost cell of a battery module. The foam layer leads to a damping within the cooling module and serves for the additional mechanical fixation of battery cells within the cooling module.

For this purpose e.g. a silicon foam having a defined compression hardness in a defined arrangement and size (area and thickness of the material) can be applied onto the battery cells in order to preload these with a predefined force. Hereby the battery cells are protected against external influences, such as e.g. impacts.

Preferably the foam-like damping means comprise a foam-like silicone. Such damping means are e.g. distributed using the tradename BISCO® BF-1000.

Particularly preferably the damping means are likewise formed from a fire protective material. Thus, such a cooling module can have a fire protective means between each battery cell. This means that each battery cell can be compartmentalized in an improved manner from a possibly burning adjacent battery cell.

Having regard to a further aspect of the invention an installation is provided that can measure a temperature of the battery cells and/or an expansion of the battery cells.

The lifetime of the battery cells can in particular be increased thereby that the battery cells can be operated at an as large as possible constant temperature through the measurement of the temperature and/or the expansion, the development of a battery behavior can be determined and monitored even more precisely. Also here in the case of an arising defect the battery module can be exchanged at the right point in time and can be restored at the site of the manufacturer.

In accordance with a particularly preferred embodiment of the invention the installation comprises a flex conductor to which sensors are connected that can measure the temperatures of the battery cells and/or the expansion of the battery cells. Preferably the sensors are arranged between adjacent battery cells.

Sensors that are arranged at a flex conductor are connected to one another in a simple manner and can be connected to the battery management system by means of a multiplex conductor, thus contacts, space and sources of error can be saved and/or minimized, wherein an even more reliable operation of the cooling module is ensured. For the rest, the corresponding measurement system can also be protected in an improved manner with respect to impacts and vibrations through the use of a flex conductor, as the sensors are screened off within the flex conductor with respect to external influences.

Furthermore, the sensors also enable a more precise readout of the temperature by means of their arrangement between adjacent battery cells. By means of the additional and/or alternative measurement of a possible change of the spacing between two adjacent battery cells it can also be determined whether the sizes of the battery cells change with respect to time.

Having regard to a preferred embodiment, the installation for measuring an expansion of the battery cells is composed of oppositely disposed contact surfaces and spacer elements of plastic that maintain a spacing between the contact surfaces in the non-expanded state of the battery cells.

If now a battery cell should expand, as there are problems associated with this battery cell, then the expanding battery cell presses onto the one contact surface and displaces this in the direction of the second contact surface. The change in spacing brings about a change of the capacity between the contact surfaces that can be measured and in this way enables a statement on the expansion of one or more battery cells.

Furthermore, a short circuit can be produced by the contact of the two contact surfaces that indicates to the battery management system that a problem has arisen.

Advantageously the tiers are composed of stackable tier elements that are stacked on top of one another. In this context a tier element is composed of a first and a second side part each having at least one flow passage, as well as of at least one planar element that extends between the side parts. In this way a cooling module can be of modular design and can also be taken apart again in a simple manner at the works for the purpose of repair and/or recycling.

Preferably holding springs are provided that hold the stackable tier elements with respect to one another. The holding springs not only secure the cooling module from the outside from an unwanted opening, but they also enable the generation of a counter-pressure from the outside by means of which the damping means can be preloaded. In order to ensure the upper and lower closure of the cooling module the cooling module is provided with a cover at the upper side that is inwardly arched and/or is provided with a base at the lower side that is inwardly arched.

Preferably, the cooling module is surrounded by a housing at at least three sides, with the housing having at least one burst region. If, in the case of fire, an overpressure should result in the housing of a cooling module this can leak out in a controlled manner by means of the predetermined breaking point made available by the burst region.

In order to positively influence the heat transfer of a cooling liquid in a cooling module, a so-called turbulator is provided in at least one flow passage at the input side and/or at the output side. Preferably a cooling module comprises insulating shells that are provided between the battery cells and the planar elements, wherein preferably a respective battery cell is adhesively bonded to each insulating shell. The insulating shells enable an electrical isolation between adjacent battery cells and with respect to the cooling module.

In accordance with a further aspect of a cooling module, at least one electronic circuit board of a battery management system is provided for the operation of a battery module. An electrical connection between the electric circuit board and the electrical contacts of the battery cells is produced by means of spring contacts, wherein the spring contacts are provided between the conductive spacer elements and the electronic circuit board, with the spring contacts forming a redundant measurement path of the battery management system and/or with the spring contacts being formed by hairpin valve springs.

Typically, electronic circuit boards are fastened to the battery cells or their spacer elements by means of screws, as the screws at times can only produce an insufficient electrical contact this can be lost during operation of the cooling module. In order to now be able to further ensure a safe operation of the cooling module the contact spring is inserted between a point of contact of the electrical circuit board and the conductive spacer elements. If the original contact fails, then this spring forms a further, redundant measurement path that can either be used additionally or in exchange.

In accordance with an advantageous embodiment of a cooling module, grooves are provided in the conductive spacer elements and each hairpin valve spring has a projection at a limb that is held in a respective groove of a spacer element in order to provide the electrical contact between the electronic circuit board and the conductive spacer elements, at least in a supportive manner. A so formed spring can be introduced into the provided groove on an assembly of a (bus) electronic circuit board of a battery module in a simple manner and thereby be provided automatically in a positionally fixed manner.

Advantageous embodiments of the invention are described in the dependent claims, the description and the figures.

Figure 1B:
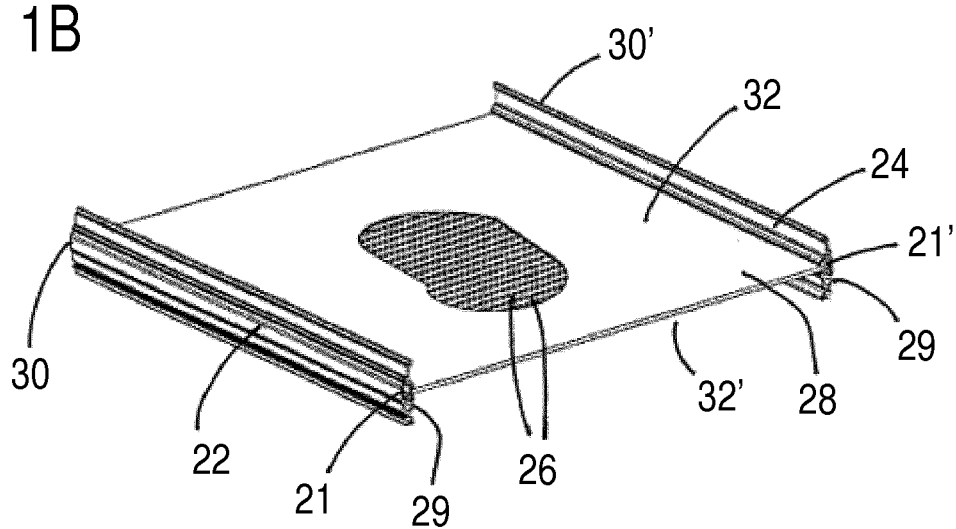
Figure 1C:
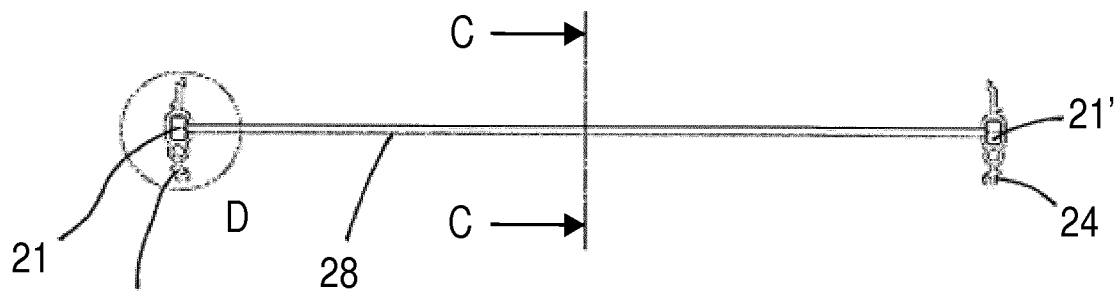
Figure 1D:
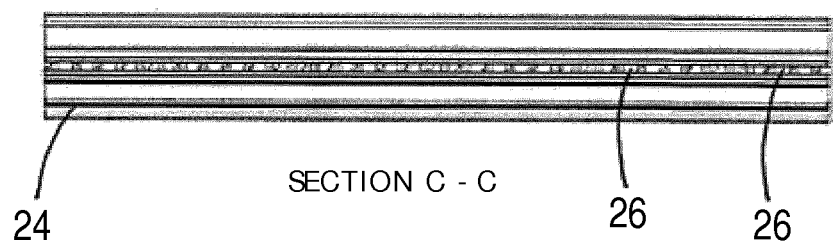
Figure 1E:
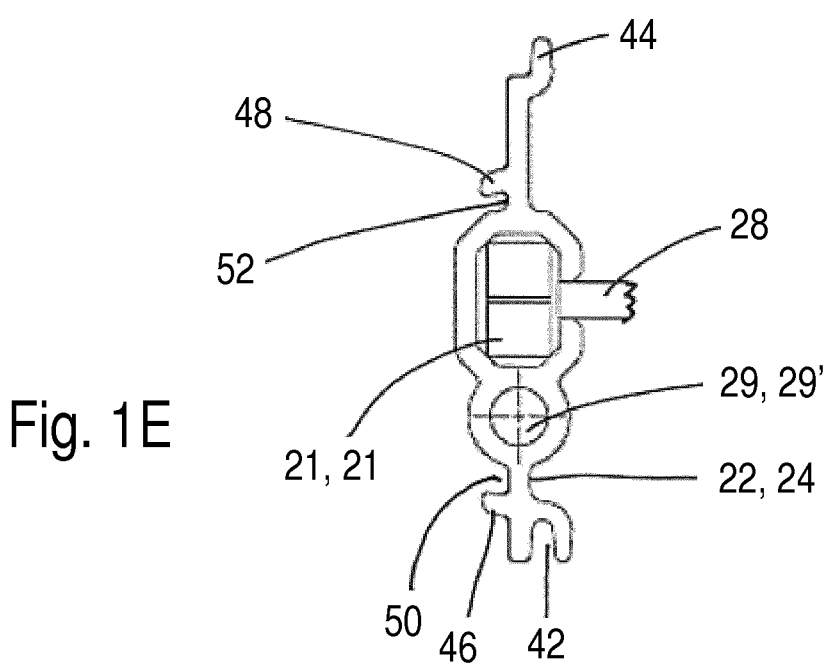
Figure 1F:
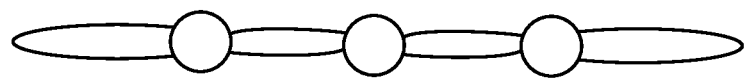
Figure 2A:
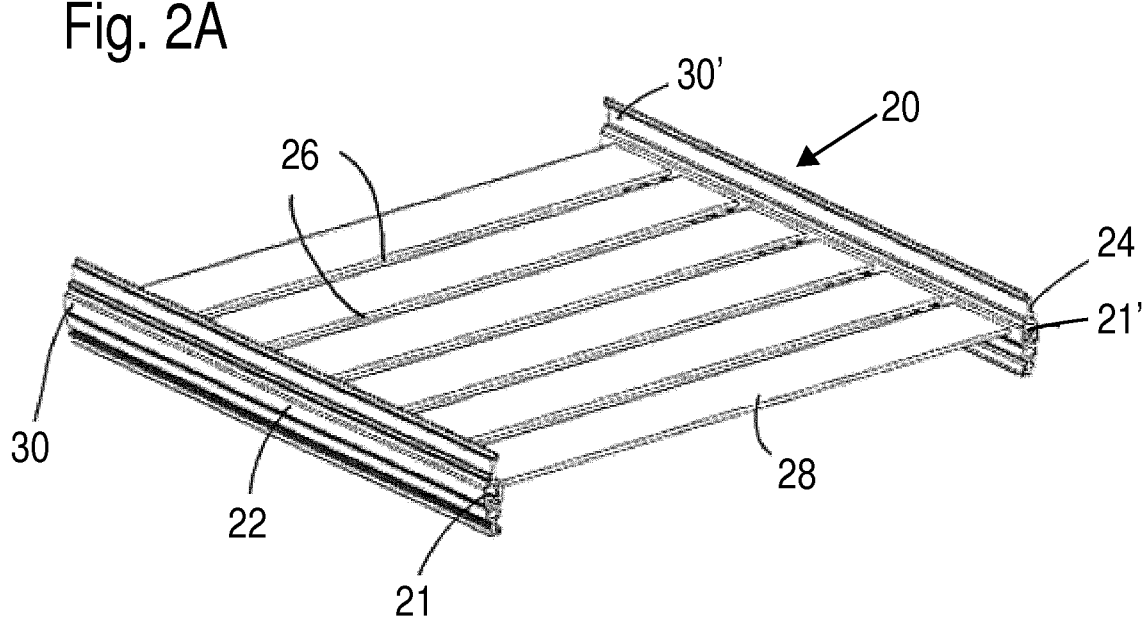
Figure 2B:
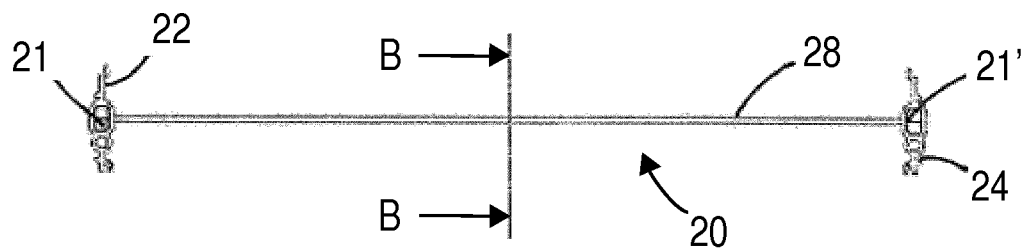
Figure 2C:
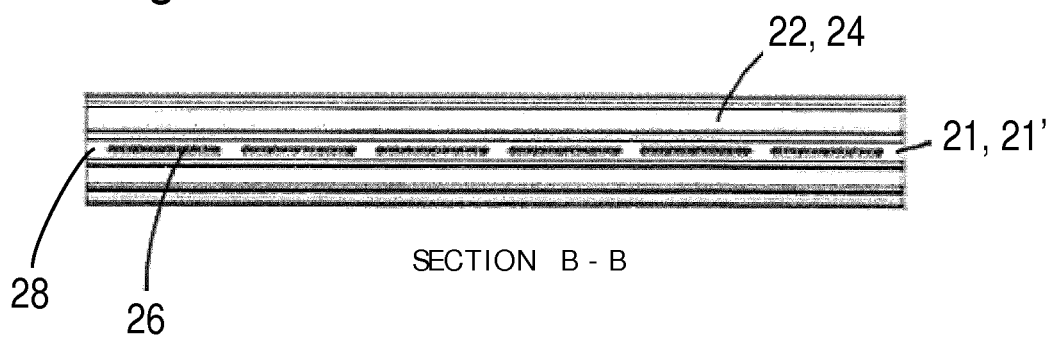
Figure 3A:
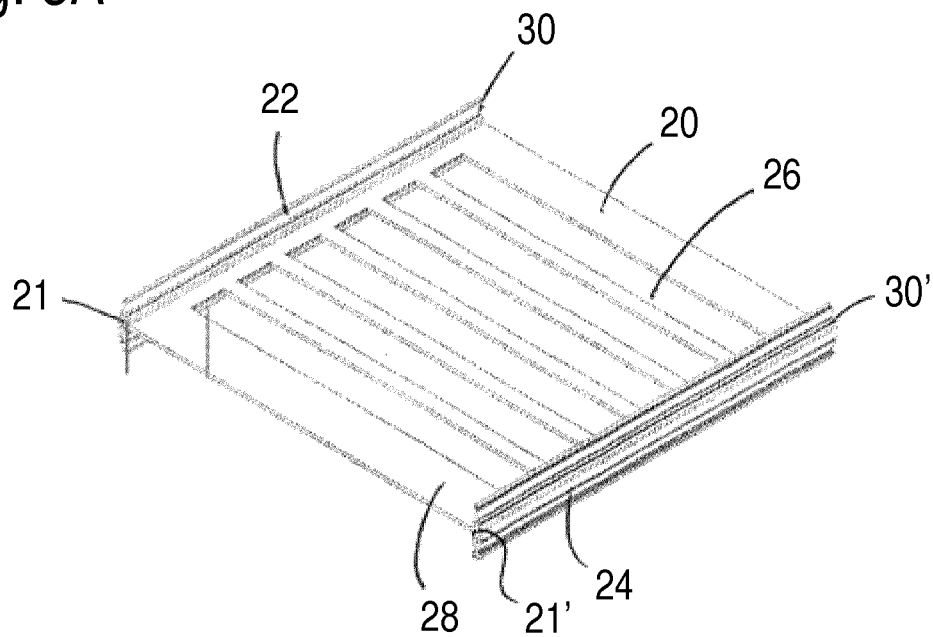
Figure 3B:
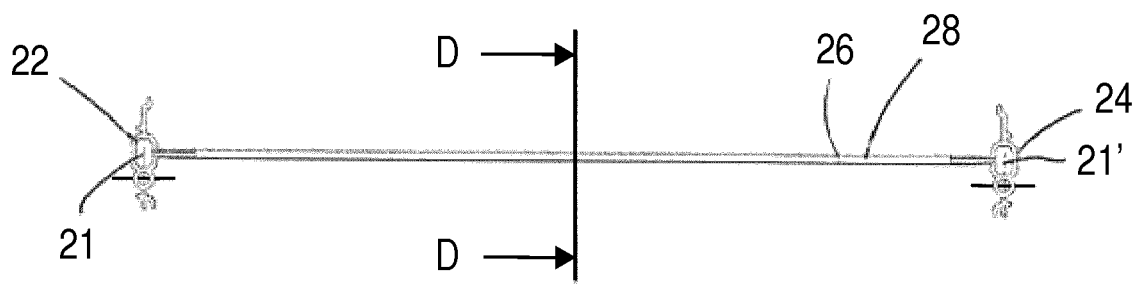
Figure 3C:
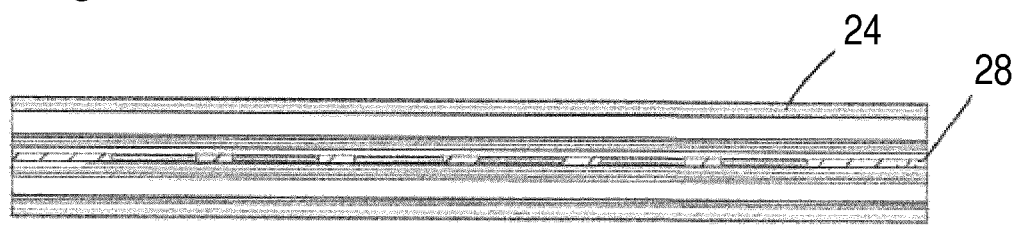
Figure 4A:
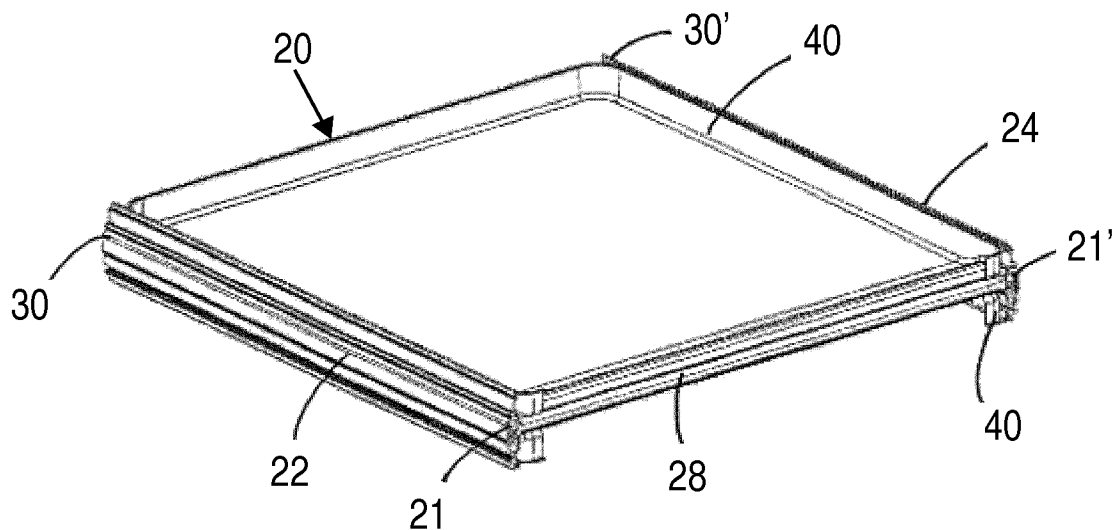
Figure 4B:
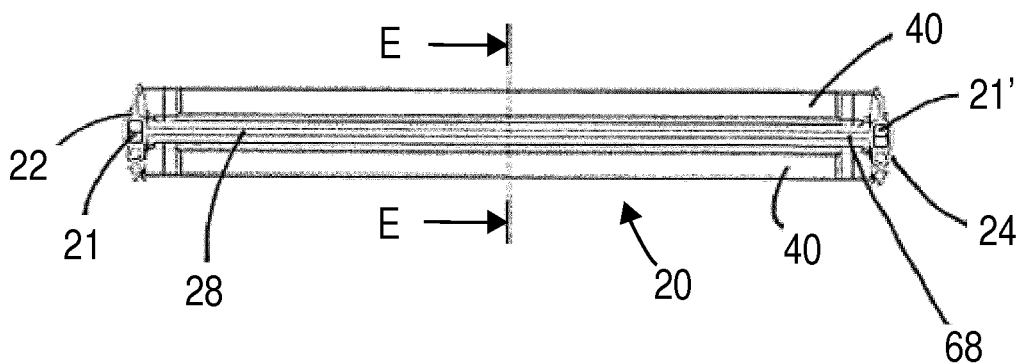
Figure 4C:
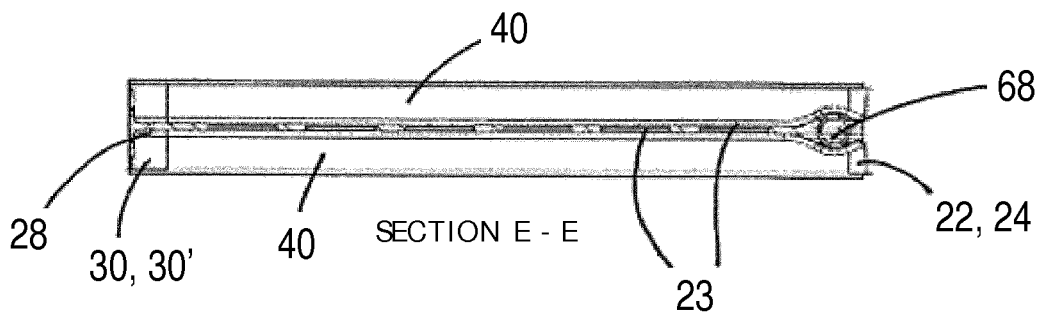
Figure 5A:
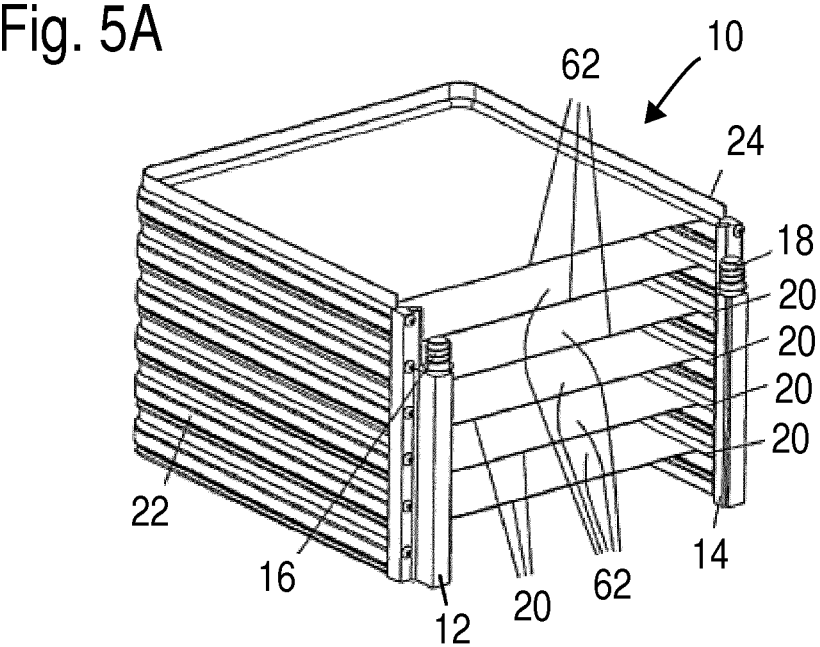
Figure 5B:
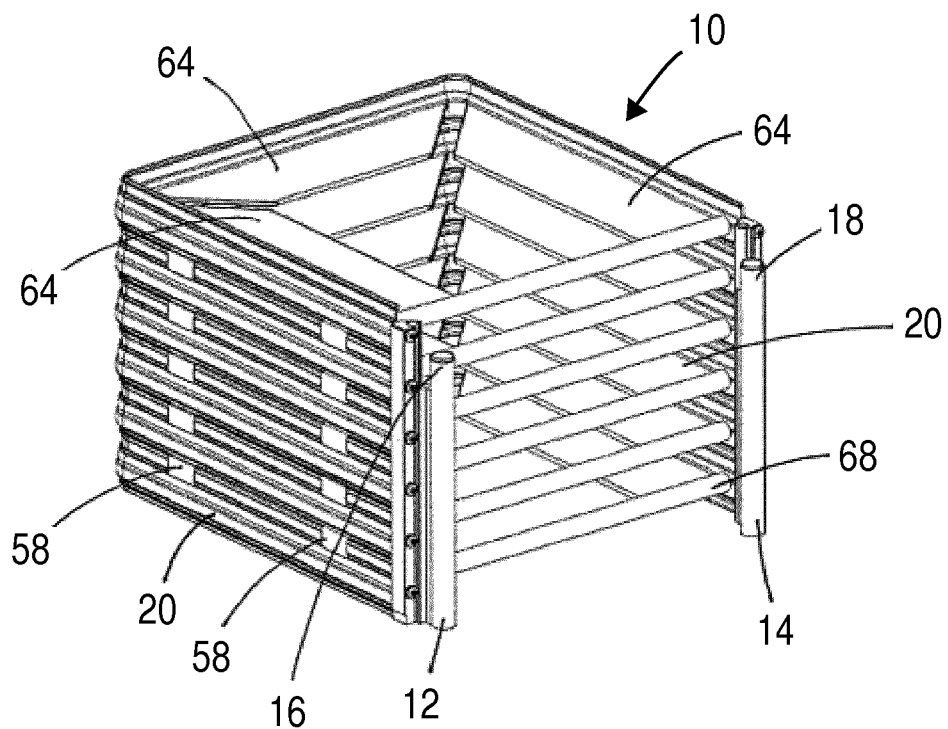
Figure 6A:
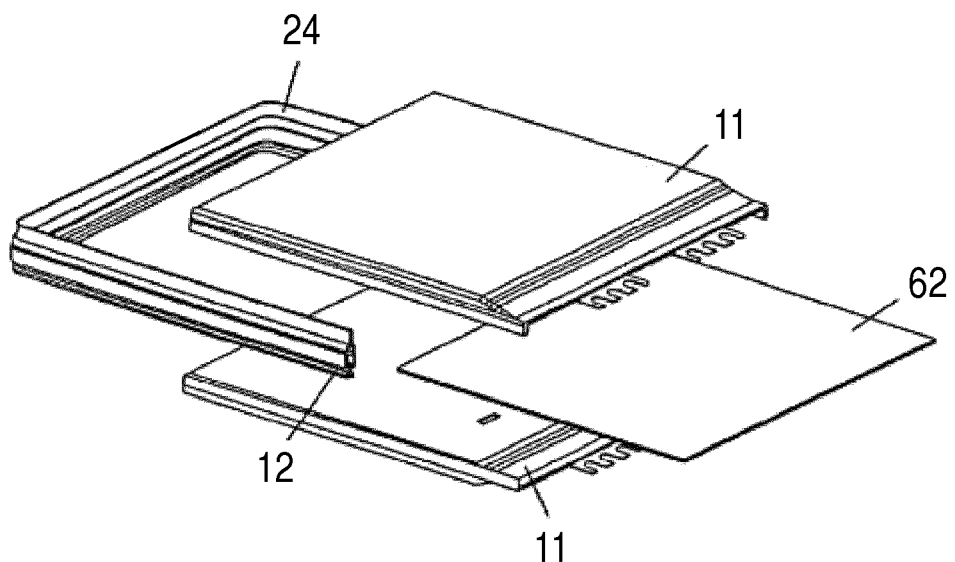
Figure 6B:
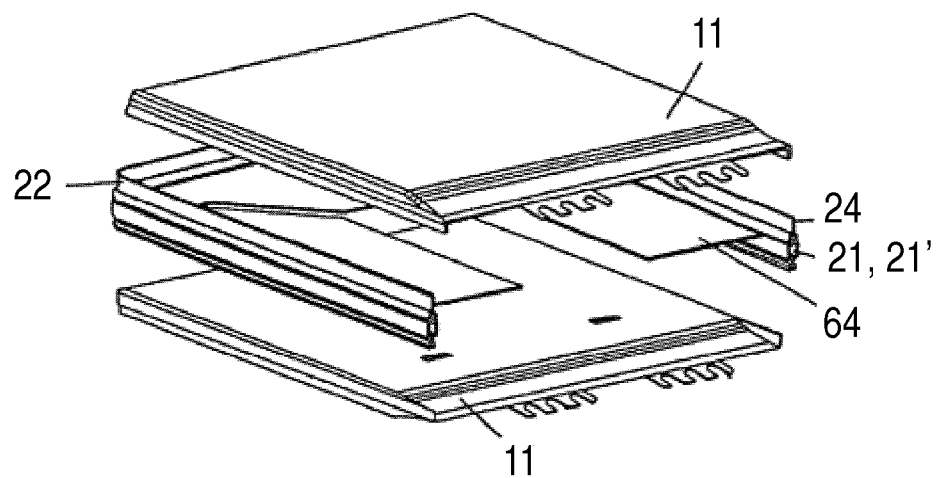
Figure 7:
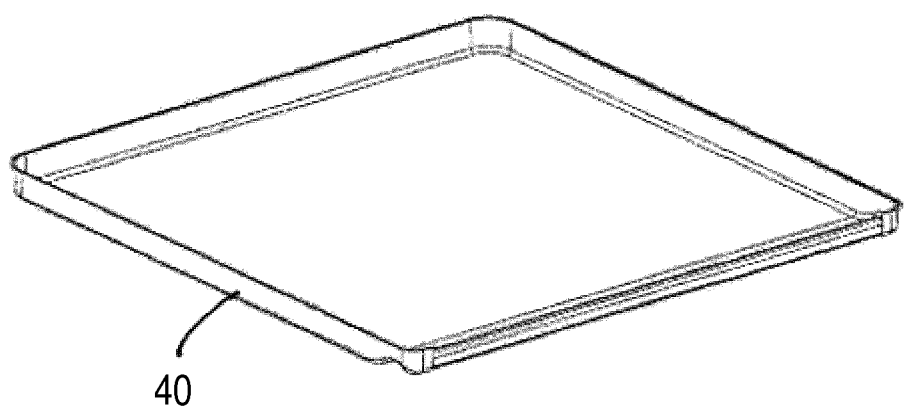
Figure 8:
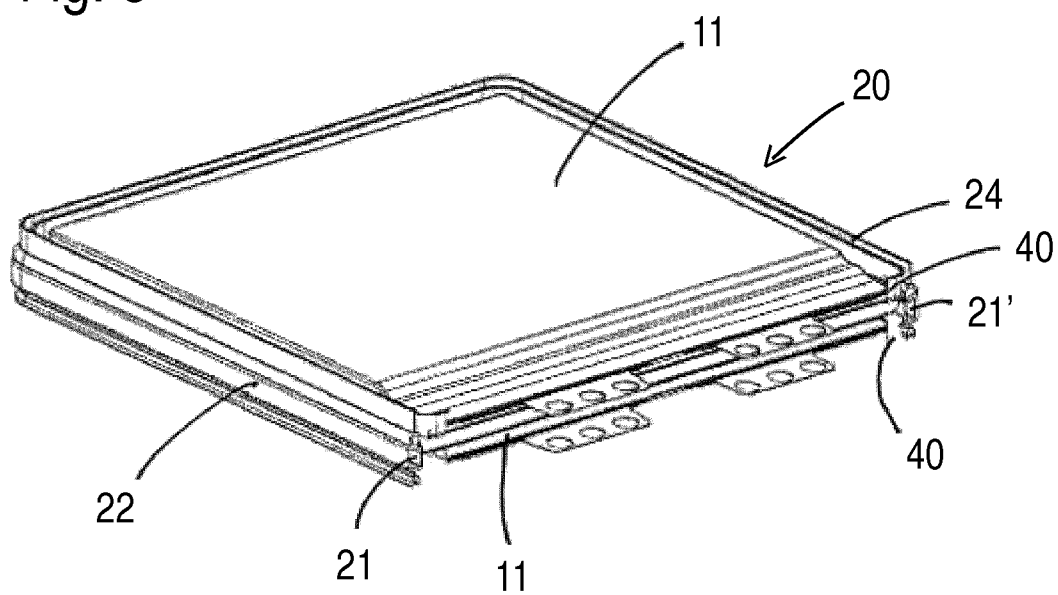
Figure 9:
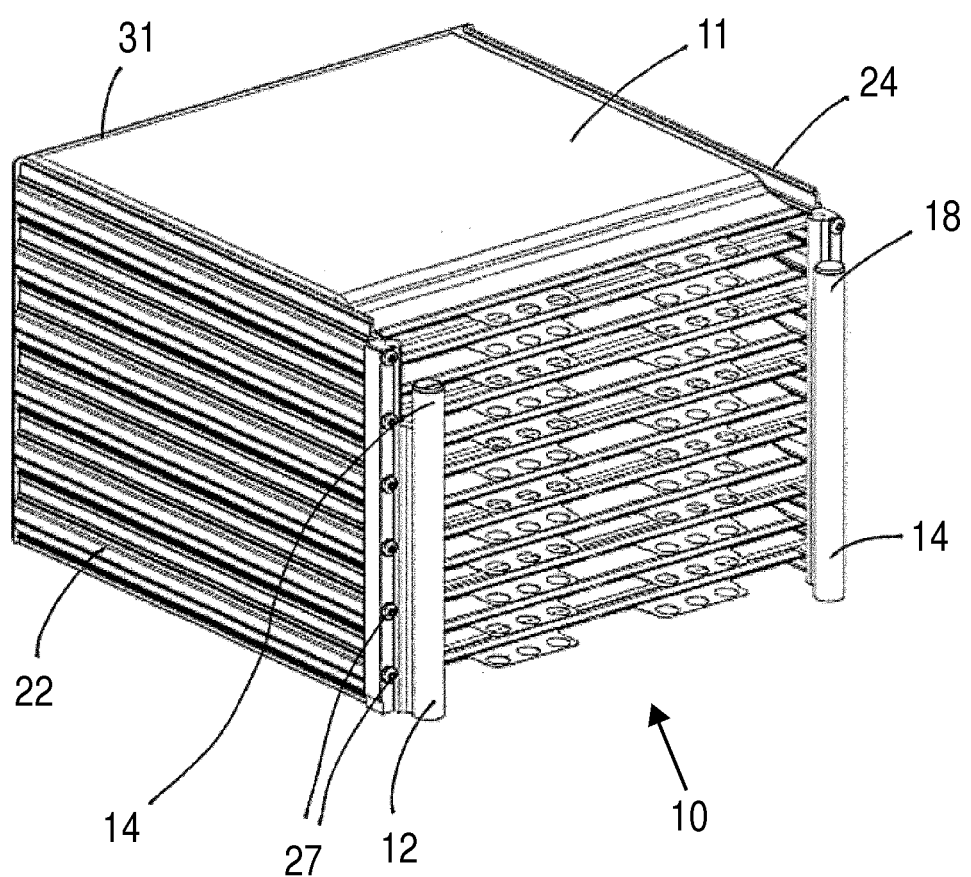
Figure 10:
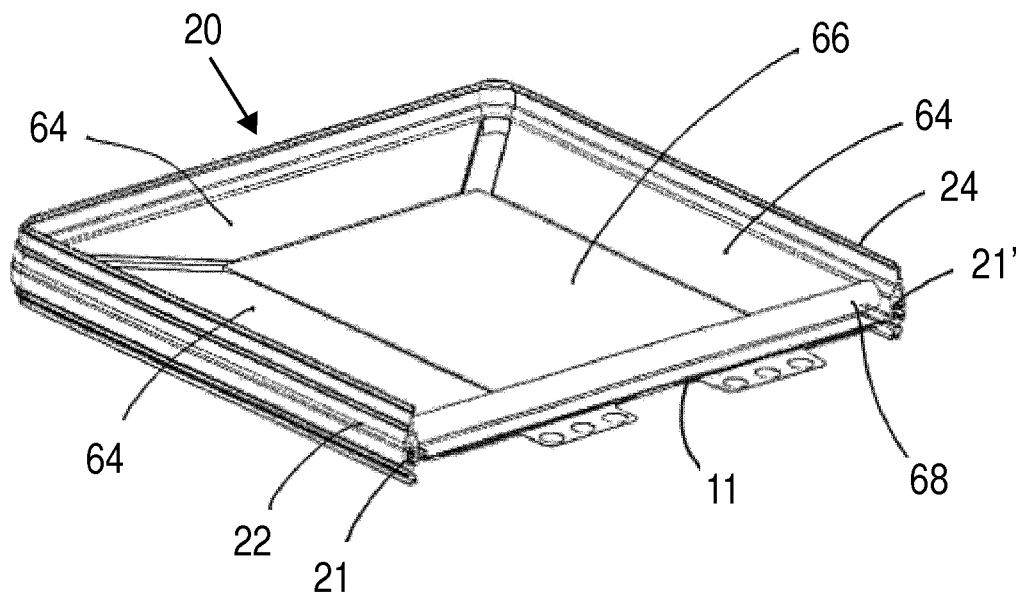
Figure 11:
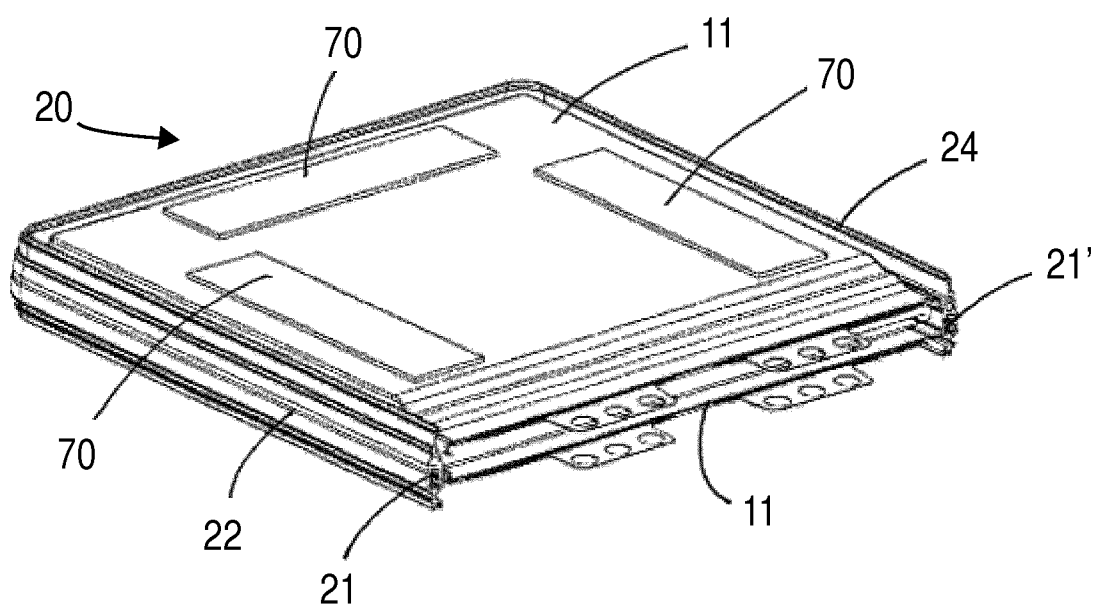
Figure 12A:
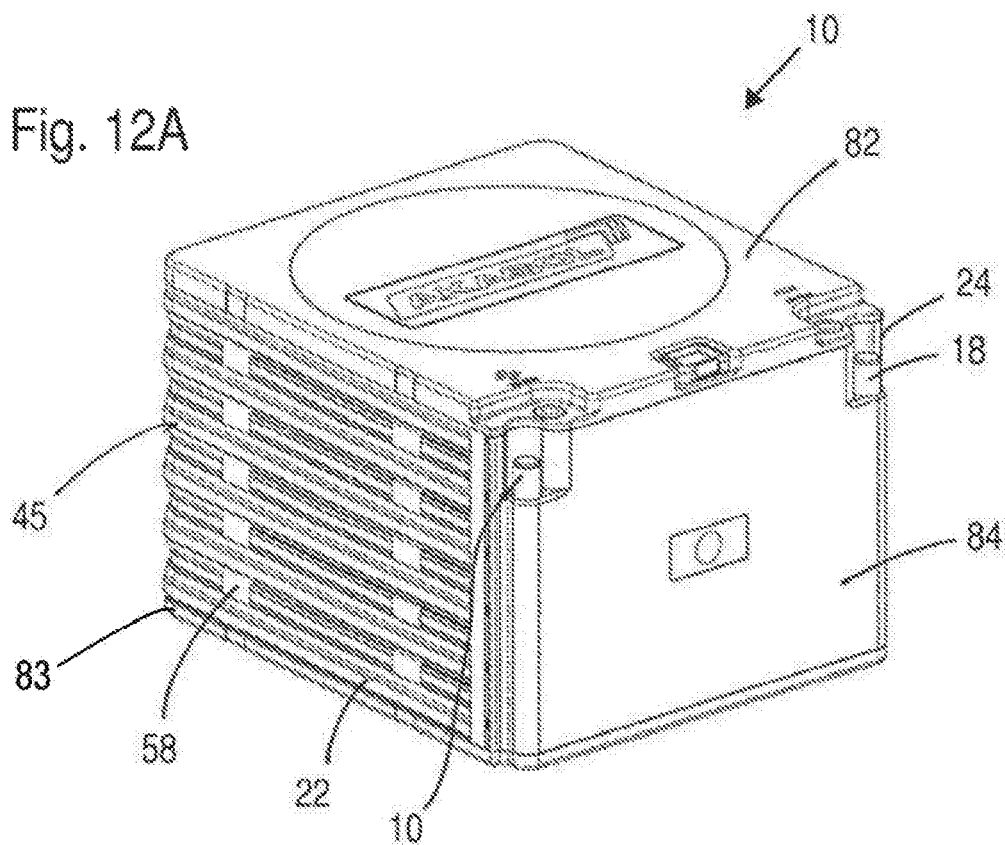
Figure 12B:
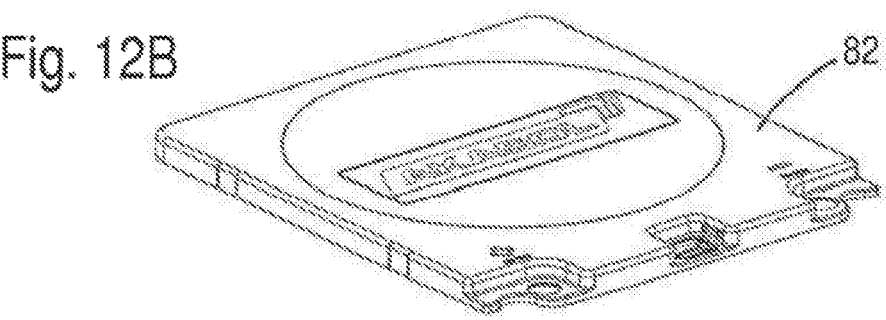
Figure 12C:
Figure 13A:
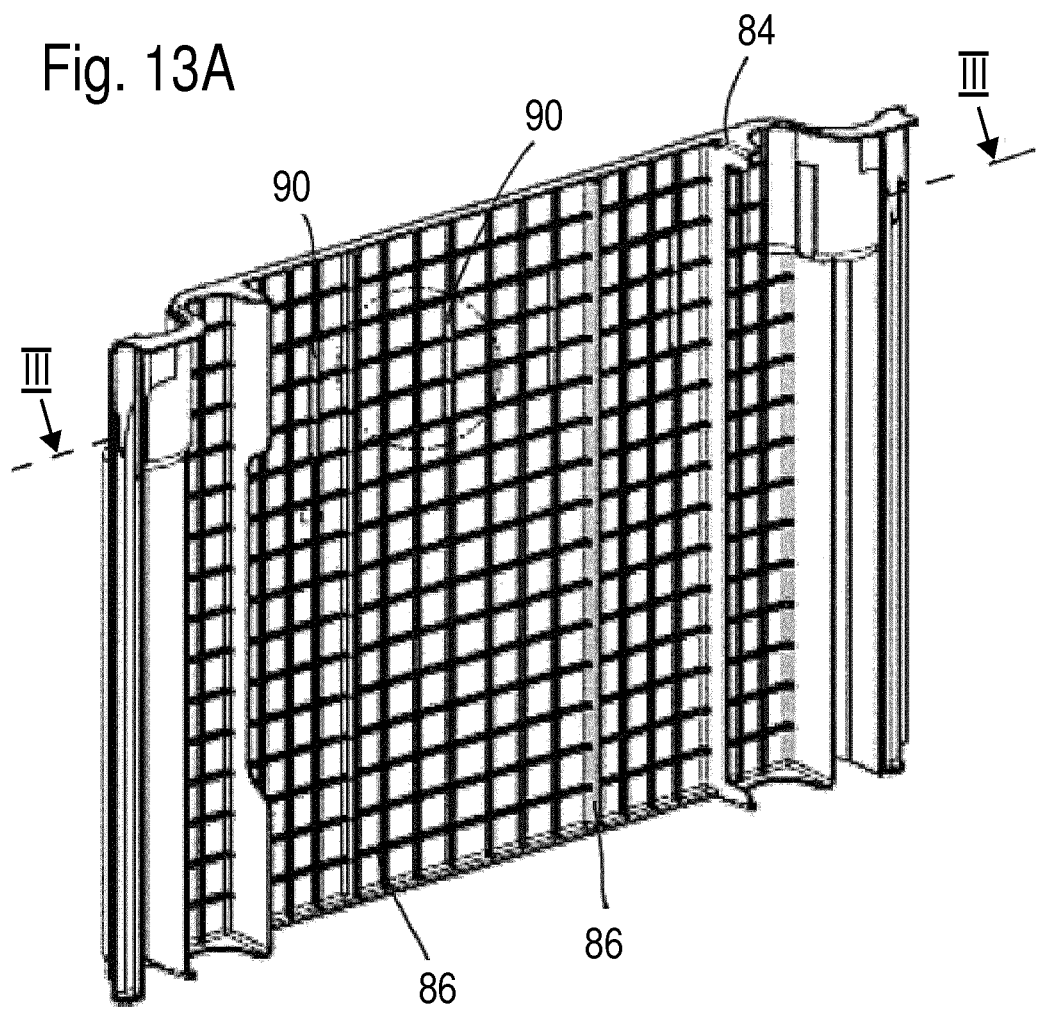
Figure 13B:
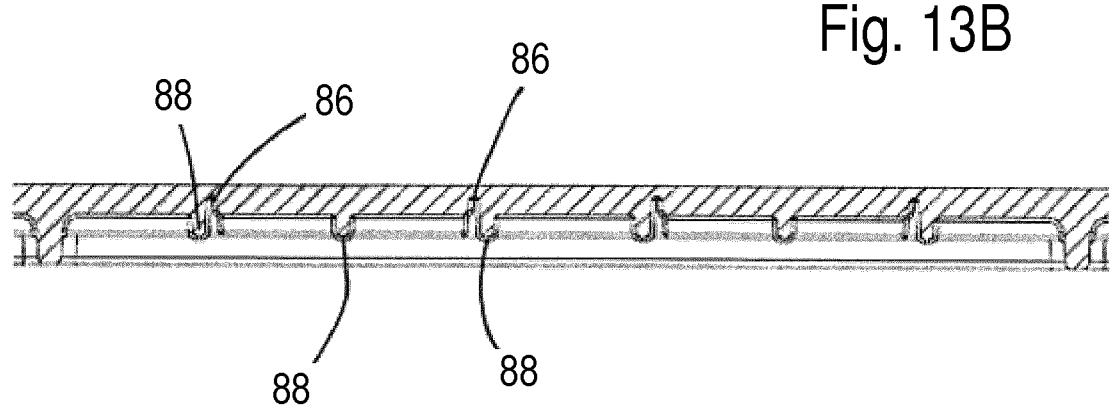
Figure 14A:
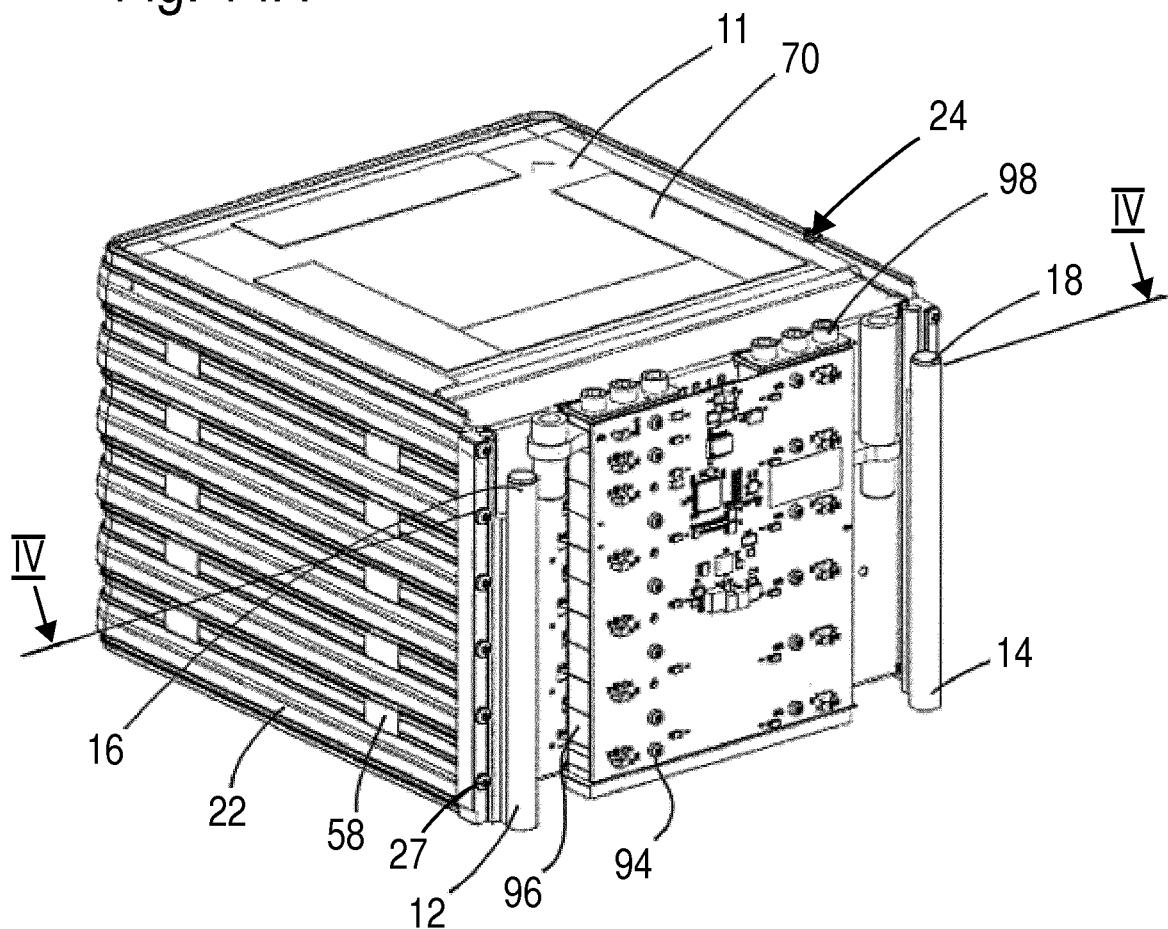
Figure 14B:
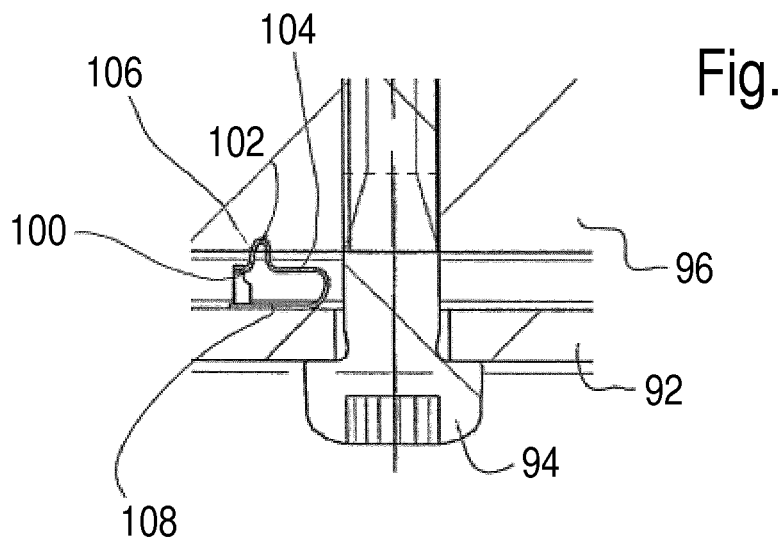
Figure 15A:
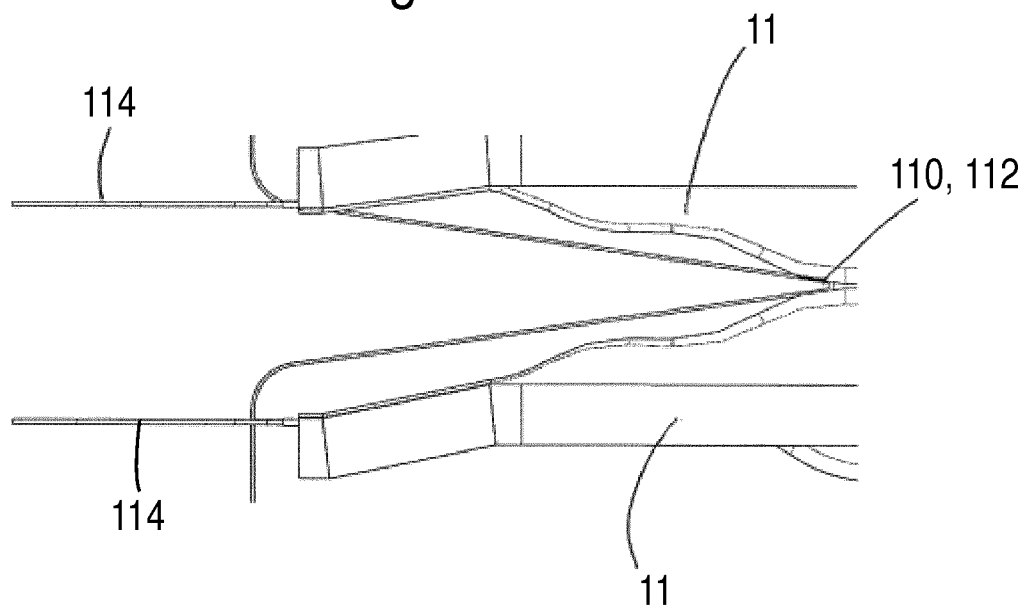
Figure 15B:
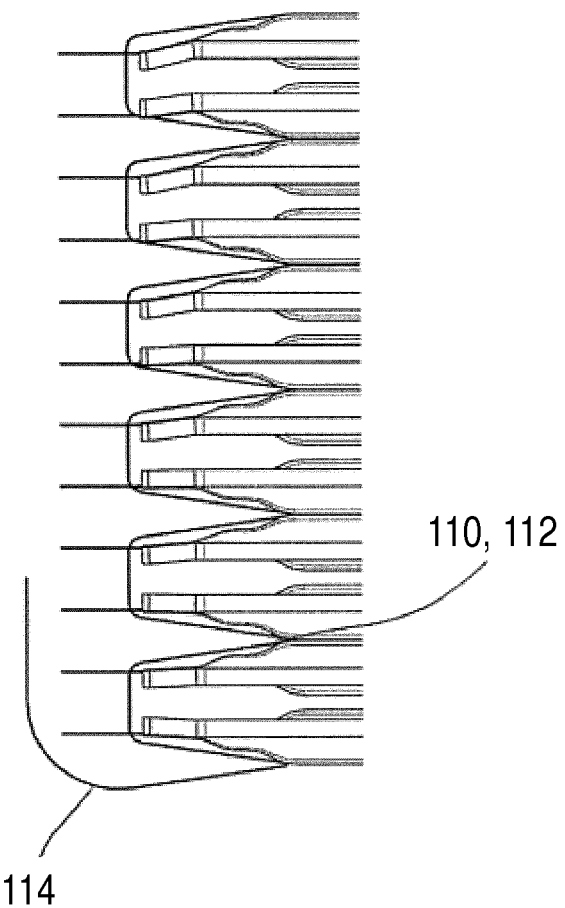

The invention will be described in the following in detail by means of embodiments with reference to the drawing in which is shown:

FIGS. 1A to 1G illustrations of a first cooling module, wherein the FIG. 1A shows a perspective illustration of the cooling module; the FIG. 1B a perspective illustration of a tier element of the cooling module; FIG. 1C a front view of the tier element of the FIG. 1A; the FIG. 1D shows an enlarged section corresponding to the sectional line C-C of the FIG. 1C; the FIG. 1E shows an enlarged perspective illustration of an end of the hollow section of the side part of a tier element of the FIG. 1C; FIG. 1F a possible design of a turbulator; and the FIG. 1G a fastening possibility of fastening two side parts to one another;

FIGS. 2A to 2C a further form of a tier element corresponding to FIGS. 1B to 1D of a further form of a tier element;

FIGS. 3A to 3C illustrations corresponding to FIGS. 1B to 1D of a further form of a tier element;

FIGS. 4A to 4C illustrations corresponding to FIGS. 1B to 1D of a further form of a tier element;

FIGS. 5A & 5B illustrations of further cooling modules, wherein the FIG. 5A shows a cooling module with installed sheet metal cooling plate and FIG. 5B shows a similar cooling module with integrated cooling wings;

FIGS. 6A & 6B exploded views of the tier elements used in the FIGS. 5A & 5B with two battery cells to be inserted;

FIG. 7 a perspective illustration of an insulating shell;

FIG. 8 a perspective illustration of a tier element having two inserted battery cells and two inserted insulating shells;

FIG. 9 a perspective illustration of a cooling module with an inserted battery cells;

FIG. 10 a perspective illustration of a tier element having inserted fire protective elements;

FIG. 11 a perspective illustration of a tier element having a foam layer;

FIGS. 12A to 12C a perspective illustration of a housing with a housing cover with concave arch;

FIGS. 13A & 13B a perspective illustration of a side of the housing of FIG. 12A seen from the inside and an enlarged sectional illustration of the side in the circulated region;

FIGS. 14A & 14B FIG. 14A shows an illustration of a battery module having an installed electronic circuit board of a battery management system and the FIG. 14B shows a schematic illustration of the attachment of the electronic circuit board of a battery management system to a battery cell of a cooling module;

FIGS. 15A & 15B schematic illustrations of a temperature sensor and/or growth sensor between adjacent battery cells of a battery module.

Features that have the same or similar function are provided in the following with the same reference numerals and it is naturally understood that the description that is given for components or component functions in connection with one embodiment are also true for other embodiments in which the same reference numerals are used unless something is stated to the contrary.

The FIG. 1A shows a perspective illustration of a battery module 1 having a cooling module 10 in accordance with the invention. The cooling module being used for the cooling of the battery cells 11 of the battery module 1 in a normal mode of operation which can, however, also be used for the purpose of heating the battery cells 11 at low outside temperatures.

The cooling module 10 has an essentially cuboid shape and has a distributor 12 in its inlet region and has a collector 14 in its outlet region. The distributor 12 and the collector 14 each have a connection and/or nozzle 16, 18 through which the coolant can be supplied and/or conducted away.

The cooling module 10 is composed of a plurality of tier elements 20, wherein six tier elements 20 are placed on top of one another in the example of FIG. 1A respectively are stacked on top of one another in order to form the cooling module 10. The cooling module 10 is in particular a cooling module of a rechargeable battery composed of a plurality of cells, such as e.g. a lithium ion battery, wherein the cells cannot be seen in FIG. 1. Each tier element 20 is specifically composed of a first and second side part 22, 24 each having at least one flow passage 21 or 21' respectively as can be seen from the FIGS. 1B to 1E, as well as of a connection installation 28 having cooling passages 26 whose cooling passages 26 extend between the flow passages 21, 21' of the side parts 22, 24. The side parts 22 and 24 that are the same in cross-section and that can be produced from an extruded part, are shown in a cross-section in FIG. 1E.

The above-mentioned distributor 12 and collector 14 are attached at the end faces to the corresponding side parts 22 or 24 respectively and indeed by screws 27 that engage through a suitable position of the distributor and of the collector in the passages 29, 29' of the side parts 22 and 24 (see FIG. 9), with seals 25 being provided between the distributor 12 and the side part 22 and between the collector 14 and the side part 24. The distributor 12 and the collector 14 have openings that communicate with the flow passages 21 or 21' respectively. The flow passages 21, 21' and the screw passages 29, 29' of FIG. 1E are respectively formed by elongate hollow passages of the extruded part of the FIG. 1E.

As is clear from FIG. 1A, a continuous plate 31 is fastened to the rear sides 30, 30' of the side parts lying remote from the distributor respectively from the collector in a sealing manner by means of further screws (not shown) that likewise engage into the screw passages 29, 29'. The plate 31 in this way stiffens the assembled cooling module and seals the rear sides of the flow passages 21, 21' of the side parts 22, 24.

A design in which a respective side part 22, 24 has an own collector 12 and an own distributor 14 at a respective end of the side part 22, 24 (not shown) is also plausible. This means that the coolant respectively only flows through a flow passage 21, 21' of each side part 22, 24 between an own collector 14 and an own distributor 12.

Furthermore, the possibility also exists that a side part 22 is connected at an end to the distributor 12 and the collector 14 is attached at the second side part 24 at the end lying remote from the distributor 12 of the second side part 24 (also not shown).

The design of the distributor 12 and of the collector 14 can take place in the exact way as it is described in detail in the WO 2012/0289298 and is also shown here in the FIG. 9. The corresponding content of the WO 2012/028298 is hereby made part of the present application.

The flow passages 20, 20' of the side parts 22 or 24 respectively, in this example, are sealed off in a fluid-tight manner at the rear sides 30, 30' of the side parts 22 or 24 by means of (not shown) sealing strips that are screwed on or adhesively bonded to or strips that are welded thereto or by means of individual plugs that can be inserted into the flow passages 21, 21' at the rear sides 30, 30', or that are attached in a different fluid tight manner.

The connection installation 28 is placed at approximately the middle of each side part 22 or 24 respectively and forms, as is evident from the FIG. 1B, a respective free space 32, 32' above and below the connection installation 28 and between the side parts 22 and 24. In order to connect the cooling passages 26 of the connection installation 28 in a flow conducting manner to the flow passages 21, 21' of the side parts 22 or 24 respectively either the wall regions of the side parts 22 or 24 respectively that define the flow passages are provided with a continuous slot into which the corresponding sides of the connection installation 28 is inserted, or the flow passages 21, 21' are produced as hollow spaces closed at all sides and the side walls are machined in order to form a slot which receives the corresponding side of the connection installation 28. The latter is the preferred solution, as one can then more reliably ensure that a fluid-tight connection takes place at the shape matched ends of the slots.

Having regard to the finished construction, as it is illustrated in FIG. 1 a, a path for the coolant is thus made available that runs as follows:

The coolant is extracted by means of a pump (not shown) from a storage supply (likewise not shown) and is introduced via a non-illustrated line into the input nozzle 16 at the distributor 12. The inner hollow space of the distributor 12 communicates with the six side parts 22 stacked on top of one another in such a way that a uniform flow takes place in each passage 21 of the six side parts 22. The coolant likewise uniformly transfers from the flow passages 21 into the individual cooling passages 26 of the connection installation 28 and flows through these. The coolant flows into the flow passages 21' of the side part 24 and from there into the hollow space of the collector 14 at the ends of the cooling passages 26 adjacent to the side parts 24. From there the coolant exits the collector 14 via the output nozzle 18 and flows via a non-illustrated line and at least one not shown heat exchanger back into the storage supply.

In other words the cooling module 10 is designed in such a way that the flow passages of each side part has a fluid communicating connection at the input side of the cooling module with a coolant conducting distributor 12, and the flow passages of the side part at the output side of the cooling module has a fluid communicating connection with a coolant conducting collector 14.

As is evident, the tier elements 20 are of preferably square or rectangular shape in a top view, but they can also have a different shape, such as a triangular shape in a top view thereof.

The construction in accordance with the FIGS. 1A to 1E can be composed of a first and second extruded or of injection molded side parts 22, 24 in the form of plastic sections, as well as of an extruded or injection molded thin-walled connection installation 28 having a plurality of cooling passages 26 with a smaller cross-section in comparison to the cross-section of the flow passages 21, 21', wherein the side parts 22, 24 and the connection installation 28 are fastened to one another by means of hot gas welding or ultrasonic welding. The plastic that is used in this context for the side parts and for the connection installation is, for example, polyamide.

The FIGS. 2A to 2C show an alternative solution that is very similar to the solution in accordance with FIGS. 1A to 1E having regard to its shape. The difference lies therein that here the first and second side parts 22 and 24 are configured as extruded sections of metal, e.g. Al, Cu or Mg or an allow of Al, Cu or Mg, having a thin-walled, brazed and/or adhesively bonded or welded connection installation 28, likewise of metal, preferably from the same metal, having a plurality of cooling passages 28 with a smaller cross-section in comparison to the cross-section of the flow passages 21, 21', wherein the side parts and the connection installation are fastened to one another by means of brazing, welding or adhesively bonding. It is also plausible to use an injection molded connection installation 28, for example in accordance with FIG. 1B, having side parts of metal in accordance with FIG. 2A or also vice versa in order to realize a tier element 20.

The connection installation 28 could also be composed of a plurality of smaller extruded sections preferably arranged next to one another and in parallel to one another, with the extruded sections having micro-passages.

One can summarize the construction in accordance with the FIGS. 2A to 2C as follows:

Lateral extruded sections 22, 24 of metal, such as e.g. aluminum, are present that are connected to one another with a thin walled brazed sheet metal cooling plate 28 having micro-passages 26. The connection of the three parts 22, 24 and 28 takes place by means of brazing, welding or adhesively bonding.

Also here the distribution in the completed module 10 takes place via manifolds 12, 14 at the one side of the module 10, whereas the termination of the sections 22, 24 is brought about by means of a plate 31 (not shown here) at the rear sides 30, 30' of the side parts 22, 24 respectively of the cooling module 10.

In a further variant the tier element 20 as is shown in the FIGS. 3A to 3C can be realized as a die cast component typically of aluminum, of an aluminum alloy, such as LM 40, or of magnesium or of a magnesium alloy, such as AlMg.

One can summarize the die cast design in accordance with the FIGS. 3A to 3C as follows:

A cooling body 22, 24, 28 in die cast design is present, wherein the main flow passages 21 or 21' respectively are realized by means of sliders. Also the open transverse passages 26 are produced by means of sliders. Sliders are understood to be movable inserts that are introduced into a die cast component mold on the manufacture of the die cast component and that are drawn from the die cast component mold for a release of the component.

The open transverse passages 26 are closed off at the top side and the bottom side in FIGS. 3A to 3C by means of plate-like elements in order to form closed cooling passages. A possible design of the plate-like elements is described in more detail in the form of insulating shells 40 in the FIG. 7.

Also in this instance the distribution of the cooling liquid in the cooling module 10 takes place via manifolds 12, 14 at the front side and the termination of the sections 22, 24 takes place with a plate 31 at the rear side, as described above.

The FIGS. 4A to 4C show a construction similar to that of FIGS. 3A to 3C in which the opened regions 23 are provided in the connection installation 28 (FIG. 4C). The opened regions 23 of the connection installation 28 form open cooling passages of the connection installation 28. In order to seal off the open cooling passages towards the upper side respectively towards the lower side, e.g. an insulating shell 40 (see FIG. 7) is respectively inserted from above or below to the connection installation 28 by means of a suitable adhesive bonding (see FIGS. 4B and 4C for a connection installation provided with insulating shells 40), also a different kind of connection of the insulating shells 40 to the connection installation is plausible. The insulating shell 40 is preferably a shell produced from PET and the connection installation 28 is produced as e.g. an aluminum die cast component.

In the FIG. 4C an optional tube 68, in particular manufactured from glass fiber reinforced plastic, can further be seen (see also the FIG. 10) which can be used for achieving a higher pressure loadability of the cooling element (mechanical pressure).

Looking back at the FIG. 1E it is evident that the hollow section has a groove 42 at a longitudinal side and the other longitudinal side has a tongue 44, wherein on the formation of a stack 45 of the hollow sections, the tongue 44 of the one side part 22 or 24 respectively of the one tier element 20 is introduced into the groove 42 of the adjacent side part 22 or 24 respectively.

Figure 1G:
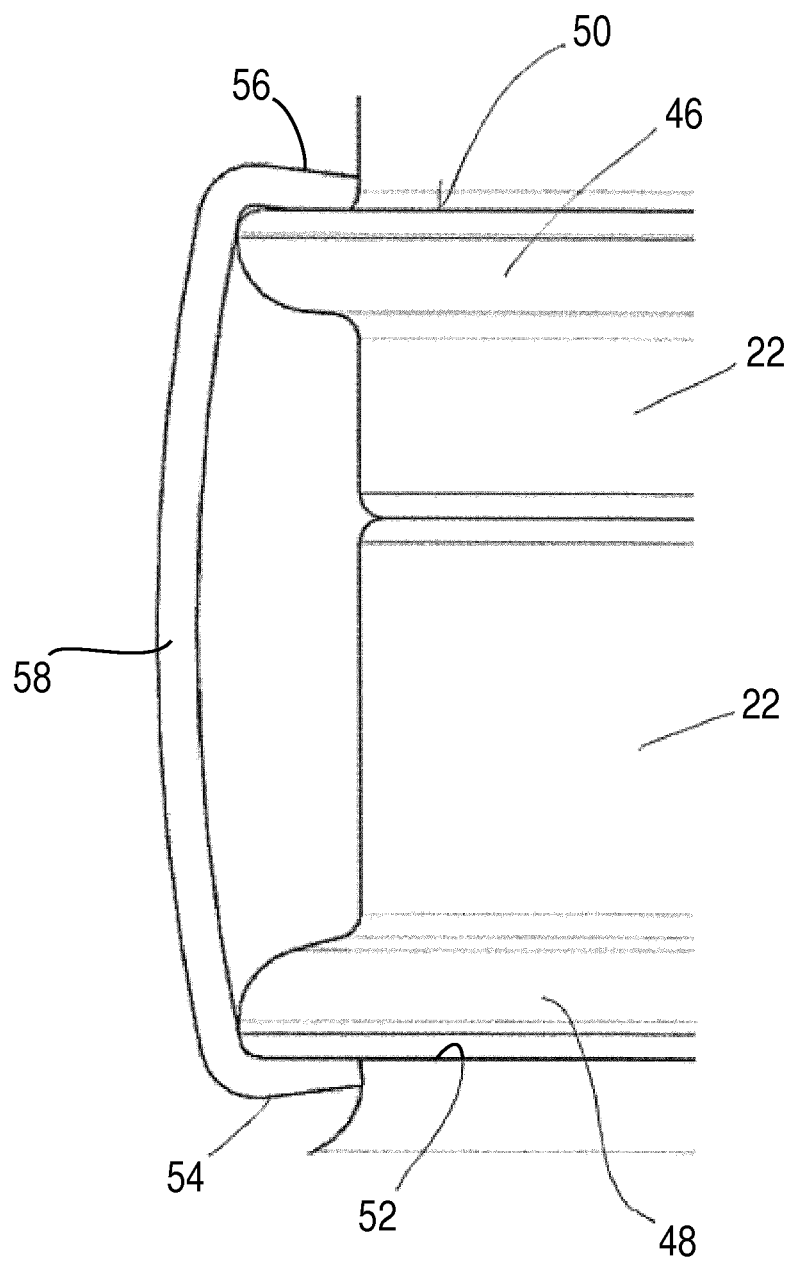

Furthermore, one can see from the FIGS. 1E and 1G that the hollow section forming the side parts 22 and 24 have two lateral noses 46 and 48 that respectively form a niche 50, 52 into which the hook-shaped ends 54, 56 of the generally C-shaped spring clamps 58 can engage in order to hold the stack 45 together. The spring clamps, their preferred spatial arrangement and their holding function can furthermore be seen from the FIG. 1A.

The extruded sections that are shown in FIGS. 1E and 1G and which form the side parts 22 or 24 respectively generally have the following features:

a) a U-shaped groove 42 at a longitudinal side;

b) a tongue (or a web respectively) 44 at the other longitudinal side that fits into the U-shaped groove of an adjacent side part 22 or 24 respectively;

c) a hollow region that defines a flow passages 21, 21' having a lateral opening or a plurality of lateral openings that enable a fluid communicating connection to a further fluid conducting element in the form of the connection installation 28 having the cooling passages 26;

d) a further bore 29, 29' extending in the longitudinal direction of the side part or passages for the reception of a fastening element, such as a screw;

e) at least one and preferably two laterally projecting noses 46, 48 at the side disposed opposite to the lateral opening or the lateral openings of the hollow section, this means at the outer side of the side part, wherein the nose or noses 46, 48 form niches 50, 52 that are configured for the reception of the hooks 54, 56 of holding springs 58, wherein the holding springs 58 hold adjacent side parts 22, 24 with respect to one another, for example, in such a way that the tongue 44 of the one side part is pressed into the groove 42 of the or of an adjacent side part, with the holding springs preferably being leaf spring-like.

In other words the spring clamps and/or holding springs 58 are provided for the purpose of holding side parts 22, 24 of at least two tier elements 20 stacked on top of one another, wherein the holding springs 58 have hook-like ends 54, 56 that engage into shape matched niches 50, 52 of the side parts 22, 24 of the tier elements 20.

Furthermore, one can see so-called turbulators 60 in the flow passage 21, 21' of the FIG. 1E. These are additional parts that are inserted into the passages of the cooling sections for the reduction of the cross-section. The aim of this is to bring about a change from a laminar flow to a turbulent flow and in this way to increase the cooling performance. At least one turbulator can be provided in each flow passage at the input side and/or at the output side. The advancing pressure decrease resulting from the turbulators must be considered with respect to the design.

FIG. 1F shows a possible design of a turbulator 60 having alternatingly arranged spherical-like regions of larger diameter and cylindrical sections of smaller diameter. In particular the turbulators are designed in such a way that these have a continuously repeating cross-section between a reduced and an enlarged cross-section.

The FIGS. 5A & 5B show illustrations of further cooling modules 10. The FIG. 5A shows a cooling module 10 having installed sheet metal cooling plates 62 and FIG. 5B shows a similar cooling module 10 having integrated cooling wings 64 whose construction is in accordance with the WO 2012/028298. Each tier 20 comprises at least one first and one second side part 22, 24 each having at least one flow passage 21, 21' which are formed by a extruded section bent to a U in such a way that a three-sided tier element 20 having a continuous flow passage 21 is formed. The tear element further comprises at least one essentially planar element 28 that extends between the side parts 22, 24. An inner space 32, 32' is formed between the at least one planar element 28 of adjacent tiers 20 and the spaces are configured for the reception of the battery cells 11, in particular for the reception of flat, rectangular or quadratic battery cells.

The FIGS. 6A & 6B show exploded views of the tiers used in the FIGS. 5A & 5B with two battery cells to be inserted.

The construction shown in the FIGS. 5A and 5B is indeed known per se can, however, be modified by means of the means described herein in order to form an improved cooling module 10, e.g. the cooling module 10 in accordance with FIGS. 5A and 5B can have a tiered manner of construction on use of side parts that are provided with corresponding noses 46, 48 in accordance with FIG. 1E, in this way, the individual tiers 20 can be held together with the holding clamps 58.

An example of the previously mentioned insulating shells 40 is shown in the FIG. 6. The insulating shells can, on the one hand, be used with the cooling module 10 in accordance with one of the FIGS. 1A to 1G, 2A to 2C, 3A to 3C, 4A to 4C in which connection plates 28 having the cooling passages 26 are used, on the other hand, the insulating shell can also be used with cooling modules 10 in accordance with FIG. 5A or 5B.

The insulating shells 40 serve different purposes. For example, having regard to a cooling module 10 in accordance with FIGS. 3A to 3C or FIGS. 4A to 4C respectively they are fastened to the connection installation 28, e.g. by means of an adhesive and in this way serve as a wall of the cooling passages 26 of the connection installation 28.

When the insulating shells 40 are used with the tier elements in accordance with FIGS. 3A to 3C or FIGS. 4A to 4C respectively, the insulating shells 40 are adhesively bonded to the upper side and to the lower side of the connection installation 28 having the integral side parts 22, 24, whereby the openings for the sliders are sealed off.

Having regard to these cooling modules 10 and having regard to the further cooling modules 10 of the FIGS. 1A to 1G, 2A to 2C, 5A and 5B described so far they together form at least one additional electric insulation between the battery cells 11 and the cooling module 10.

Furthermore, they can take on an additional protective function for the battery cells 11 with respect to all cooling modules 10.

The insulating shells 40 are preferably produced in a deep drawing process of PET film and are adhesively bonded both to the cell and also to the cooling, this means e.g. to the connection installation 28 and/or to the cooling wings or to sheet metal cooling plates. They should have an as low as possible wall thickness in order to minimize their influence on the cooling performance. They have a closed base having a peripheral boundary at whose front side recesses are installed for the cell tabs e.g. by means of a stamping process.

The use of insulating shells 40 that are described in the foregoing in connection with the embodiments in accordance with the FIGS. 3A to 3C and FIGS. 4A to 4C is not limited to this embodiment, but rather can be used having regard to each embodiment in which a reception space 32, 32' is formed above and beneath a connection installation 28 and for all other plausible constructions that have reception spaces for the battery cells.

The FIG. 8 for example shows a drawing like the FIG. 12 of the WO 2012/028298, in which a battery cell is respectively adhesively bonded to each plastic shell of a tier element. The stacked tier elements with insulating shells and battery cells are then to be understood in accordance with the FIG. 9. How such battery cells have to be combined to a battery module is described in detail in the document WO 2010/121831 whose corresponding content is made content of the present description and will not be explained further in detail in this respect.

Rather than receiving the battery cells in the individual tier elements (in their reception spaces 32 and 32') and to then combine the tier elements to a stack 45 it is also possible to form the stack 45 first and to then insert the battery cells 22 after completing the stack 45 into its spaces that are respectively formed by two reception spaces 32 and 32' of two adjacent tier elements. In this respect also further battery cells can be inserted into the remaining uppermost reception space 32 of the uppermost tier element and into the lowermost reception space 32' of the lowest tier element.

Regardless of which manner of assembly is selected, the reception spaces 32 and 32' are filled by the reception of, in particular flat rectangular or cuboid, battery cells.

The present invention also comprises a method for the manufacture of a cooling module 10 of a battery module composed of rechargeable cells, the method comprises the steps:

a) manufacturing of a plurality of like tier elements 20, wherein each tier element is composed of a first and a second side part 22, 24 each having at least one flow passage 21, 21' as well as of a connection installation 28 having cooling passages 26, with the cooling passages 26 of the connection installation extending between the flow passages 21, 21' of the side parts 22, 24;

b) forming a stack 45 from the tier elements 20;

c) introduction of the cells into the spaces 32, 32' that are defined by the connection installation 28 and the side parts 22, 24;

d) attachment of a flow distributor 12 at the input side of the stack to the side parts 22 present there and attachment of a collector 14 at the output side of the stack 45 at the side parts 24 present there;

e) closing the flow passages 21, 21' of the side parts 22, 24 at the ends of the flow passages 21, 21' of the side parts 22, 24 remote from the flow distributor 12 and/or the collector 14; and f) attachment of holding clamps 58 or holding springs in order to hold the tier elements 20 with respect to one another.

Having regard to this method either g) a respective cell is attached at each side of each connection installation 28 and the tier elements 20 are subsequently combined to a stack; or h) the tier elements 20 are combined to a stack 45 and the cells are only then retrospectively introduced into the spaces 32, 32' respectively formed by two adjacently arranged tier elements 20; basically also the possibility exists of introducing one or more battery cells into each space, preferably two battery cells are introduced per space 32, 32'.

Preferably the method also comprises the further step of:

j) the attachment of insulating shells 40 at the two sides of the connection installations 28 and at the flat sides of battery cells, wherein the insulating shells 40 are preferably applied prior to the assembly of the tier elements 20 to a stack 45 and the corresponding battery cells are only then applied to the free lying side of the insulating shells 40 or the insulating shells 40 are each applied onto a side of a cell and subsequently the free side of the insulating shell 40 is applied onto a connection installation 28 of an individual tier element 20 or two cells lying next to one another with their insulating shells 40 are facing outwardly are introduced into a space 32, 32' formed between two adjacent connection installations 28 of two adjacent tier elements 20.

FIG. 10 shows a tier element 20 with cooling wings 64 in accordance with the cooling module 20 in accordance with FIG. 5B. A fire protective element 66 is arranged in the space that is formed between the cooling wings 64 in the plane of the cooling wings 64. It is a non-flammable, thermally insulating material that is arranged between the battery cells 11 of a tier element 20 composed of a double cell arrangement respectively having a battery cell 11 above and beneath the cooling wings 64 (in the present instance only the upper battery cell 11 is schematically illustrated with lines).

In this connection also a flame retarding material or a material which foams up on the influence of heat can be arranged between the battery cells 11 of a double cell arrangement in order to insulate the cells thermally in an improved manner with respect to one another.

Where applicable, two insulating shells (like 40—not shown) can be arranged between the battery cells 11 and the cooling wings 64 and/or the fire protective element 66 having regard to such a tier element 20. The fire protective element 66 should prevent the spreading of a fire between adjacent battery cells 11 in the event of a fire of a cell and can moreover serve for an additional mechanical fixation of the battery cells 11.

For example, a silicate fiber plate, a plate made of an expandable foam that foams up on the effect of temperature, a mineral fiber plate, a steel plate or an aluminum plate can be used as a fire protective element 66.

Such fire protective elements 66 can also be arranged between adjacent battery cells 11 and/or between the uppermost battery cell and a cover of the cooling module 10 (see FIG. 12B), and/or between the lowermost battery cell and a base of the cooling module 10 (not shown); and/or at the front side of the cooling module 10 between the electrical contact rows composed of the electrical connections of the battery cells 11 and the spacer elements, as well as outside of these connection rows at the side of the battery cells 11 facing the electric circuit board supporting the battery management system.

Furthermore, the FIG. 10 shows a stabilizing element 68 that is arranged between the oppositely disposed side parts 22, 24 of a tier element 20. Such a stabilizing element 68 prevents a spreading apart of the side parts 22, 24. Also the (mechanical) pressure resistance of a cooling module is increased through the use of a stabilizing element 68.

It is particularly favorable when, as is shown in the FIG. 11, a foam insert 70 composed of plastic or silicone is arranged between two cells that are arranged in a reception space, wherein, for reasons of clarity, only the one half of a reception space is shown and the upper respectively the lower cell is not indicated.

Where applicable, such a foam insert can be attached to the uppermost and lowermost cell of the battery module (not shown). The foam insert can also be replaced by a different kind of damping element that achieves a damping of the construction, that additionally serves for the mechanical fixation of the cells 11 also having regard to a possible loss of vacuum of the battery cells 11. For this purpose, e.g. a silicone foam having a defined compression stability is applied in a defined arrangement and with the defined size (area and thickness of the material) onto the cells 11 in order to preload these with a pre-defined force. It should be noted in this regard that the compression stability of the foam material must be selected in such a way that the battery cells are not damaged on an assembly, but are held with respect to one another by means of the silicone foam such that no free spaces can arise and in order to protect the battery cells from external influences such e.g. impacts.

The specific foam is applied in a defined arrangement and size (area as well as the thickness of the material) in order to preload these with a predefined force. In this connection the foam is present between each double pack, as well as on the uppermost and lowermost cell.

A material can also be used as a foam that has a fire protective function such that the fire protective material 66 and the damping element 70 can be the same material.

On the use of a fire protective material 66 and/or of a damping element 70 the construction space of a battery module is not enlarged in the ideal case of application.

The foam 70 also increases the capability of the battery of absorbing pressure forces.

As is shown in the FIGS. 12A, 12B and 12C, a three-part housing 80 includes a front side 84 (see e.g. FIG. 13A), a cover 82 that is inwardly arched prior to installation as shown in FIG. 12C used above the stack 45, and a base 83 that is likewise inwardly arched prior to installation as shown in FIG. 12C used beneath the stack 45. Hereby a bending through of the housing plates is compensated on the application of a force from the inside, in such a way that in the installed state of the cover 82 and of the base 83, i.e. the housing plates are no longer concavely arched, but are flat after the absorption of the forces introduced by the damping elements.

The aim is that no bending towards the outside arises. An ideal design has a flat non-arched outer surface.

Furthermore, as shown in the FIGS. 13A and 13B at least one pre-defined weakened region 90 can be provided in the housing 80, this means that a predetermined breaking point can be provided in at least one part of the housing, in the present instance in the front side 84 of the housing 80. This region opens up by way of material breakage at an over-pressure present in a battery module 10. This weakened region enables an out-gassing in the predefined region.

FIG. 13A shows a rear view of the front side 84 of the housing 80 having stiffening ribs 86 extending in a horizontal and perpendicular manner from a planar outer side in the direction of the inner side of the cooling module 10. The stiffening ribs are provided in a crossed arrangement.

FIG. 13B shows a section along the sectional line III-III of the FIG. 13A. In this sectional drawing it is evident that some stiffening ribs 86 are provided with notches 88 in order to form the predetermined breaking points.

FIG. 14A shows an illustration of a battery module 1 having an installed electronic circuit board 92 of a battery management system. In order to connect the electronic circuit board 92 to the battery cells 11 in an electrically conductive manner, the electronic circuit board is directly brought into contact with connections of the battery cells 11 and is screwed to these by means of screws 94.

FIG. 14B shows a part section through a screw 94 along the sectional plane IV-IV in accordance with FIG. 14A. The screws 94 fasten the electronic circuit board 92 to the spacer elements 96 of the connection rows composed of the spacer elements 96 and of the battery cell connections that are pressed to one another by means of a clamping connection formed by perpendicularly extending clamping bolts 98. Such a battery management system and its connection to the battery cell 11 is described in detail in WO 2010/121829.

A plurality of spring contacts 100 are provided between the electronic circuit board 92 and the spacer elements. These essentially have the shape of hairpin valve needles 100 having a nose 102 at a limb 104, the nose 104 can engage into corresponding grooves 106 of the spacer elements and bring about a secure contact between the spacer elements and the electronic circuit board.

Preferably the spring contacts contact the conductive regions of the electronic circuit board 92 with their second limb 108. These additional spring contacts 100 form additional redundant measurement paths of the battery management system in addition to the measurement paths formed by the screws 94 and the conductive spacer elements.

The aim of the redundant measurement paths is to maintain the function of the measurement paths also having regard to a failure of a screwed connection (first measurement path) as the main measurement path. On manufacturing the electronic circuit board of the battery module 1 the spring contacts 100 can be automatically introduced in an automatic placement machine.

The grooves 106 of the spacer elements 96 ensure that the battery management system can lie cleanly on the clamped connection in a planar manner.

The FIGS. 15A & 15B show schematic illustrations of the attachment of a temperature feeler and/or of a growth feeler 110, 112 between adjacent battery cells 11 of a battery module 1.

These enable a temperature measurement and/or a growth measurement (increase in thickness) directly at the battery cells 11. For the purpose of the temperature measurement the temperature sensors 110 are inserted at so-called flex conductors 114 between the battery cells 11. The flex conductor(s) 114 is/are connected at suitable positions of the electronic circuit board 92 of the battery management system for the temperature and/or growth measurement.

For example, the temperature sensors 110 can be formed by so-called NTC resistors (negative temperature coefficient thermistors). The temperature sensors 110 can be provided at each battery cell 11. These are however thermally separated from one another by means of the insulating foam.

For the measurement of growth, contact surfaces are provided with spacer elements of compression foam. On a cell growth a compression of the foam is brought about and in this way a connection of the two contact surfaces is indicated to the battery management system.

Alternatively pressure sensors can be used as growth sensors 112. Also the growth sensors 112 are connected to suitable positions of the electronic circuit board 92 of the battery management system using corresponding flex conductors 114. The temperature sensors, like the pressure sensors can also be picked and placed commonly at a flex conductor.

Geometric expressions such as e.g. above or below are respectively always used with reference to the embodiment shown in the drawing and their arrangement in the respective Figure. It is naturally understood that the embodiments can be changed with respect to their geometric position.

LIST OF REFERENCE NUMERALS 1 battery module
10 cooling module
11 cells, battery cells
12 distributor
14 collector
16 connector, input nozzle
18 connector, output nozzle
20 tier element
21, 21' flow passage
22 side wall
23 open region
24 side wall
25 seals
26 cooling passages
27 screws
28 connection installation
29, 29' bore, aperture
30 rear side
31 plate
32, 32' free space
40 insulating shell
42 groove
44 tongue, spring, limb, web
45 stack
46 nose
48 nose
49 holes
50 niche
52 niche
54 hook-shaped end
56 hook-shaped end
58 holding clamp
60 turbulator
62 sheet metal cooling plate
64 cooling wing
66 fire protective element
68 stabilizing element
70 foam
80 housing
82 cover
84 front side
86 stiffening rib
88 notch
90 weakened region, burst region
92 electronic circuit board
94 screws
96 spacer elements
98 clamping bolt
100 spring contact
102 nose
104 limb
106 groove
108 limb
110 temperature sensor
112 growth sensor
114 flex conductor

The invention claimed is:

1. A battery module comprising battery cells and a cooling module having a plurality of tiers, wherein the plurality of tiers each comprise stackable tier elements that are stacked on top of one another and wherein a tier element comprises a first and a second side part each defining a passage having a circumferentially closed cross section forming at least one flow passage through each first and second side part for the use of a liquid coolant, wherein each tier element further comprises a planar element which extends in a planar manner between the first and second side parts, wherein an inner space is formed between adjacent planar elements of different tiers, and wherein at least one of the battery cells is arranged in said space, the battery module further comprising damping means, with the damping means comprising a foam and being arranged in a planar manner on individual battery cells in order to preload these with a predefined force, the battery module further comprising fire-protective means, wherein the fire-protective means are configured to foam up on the influence of temperature, and wherein the damping means comprise a foam-like silicone.

2. The battery module in accordance with claim 1, wherein the damping means are arranged in the region of the spaces for the reception of the battery cells.

3. The battery module in accordance with claim 1, wherein the damping means also comprise a fire-protective material.

4. The battery module in accordance with claim 1, further comprising an installation that can measure at least one of a temperature of the battery cells and an expansion of the battery cells.

5. The battery module in accordance with claim 4, wherein the installation comprises a flex conductor to which sensors are connected, with the sensors measuring at least one of the temperature of the battery cells and the expansion of the battery cells.

6. The battery module in accordance with claim 5, wherein the sensors are arranged between adjacent battery cells.

7. The battery module in accordance with claim 4, wherein the installation for measuring an expansion of the battery cells comprises oppositely disposed contact surfaces and spacer elements of foam that maintain a spacing between the contact surfaces with respect to one another in the non-expanded state of the battery cells.

8. The battery module in accordance with claim 1, further comprising holding springs that hold the stackable tier elements together.

9. The battery module in accordance with claim 1, wherein the cooling module is surrounded by a housing at least three sides.

10. The battery module in accordance with claim 9, wherein the housing has at least one burst region.

11. The battery module in accordance with claim 1, wherein the cooling module further comprises at least one of a cover at the upper side that is inwardly arched prior to installation of the cover and a base at the lower side that is inwardly arched prior to installation of the base.

12. The battery module in accordance with claim 1, further comprising a turbulator that is arranged in at least one flow passage at at least one of an input side and an output side of the at least one flow passage.

13. The battery module in accordance with claim 1, further comprising insulating shells that are arranged between the battery cells and the planar elements, with a respective battery cell being adhesively bonded to each insulating shell.

14. The battery module in accordance with claim 1, further comprising at least one electronic circuit board of a battery management system for the operation of a battery module and wherein an electrical connection is produced between the electronic circuit board and electrical contacts of the battery cells by means of spring contacts, wherein the spring contacts are provided between conductive spacer elements and the electronic circuit board and with the spring contacts forming a redundant measurement path of the battery management system.

15. The battery module in accordance with claim 14, wherein the spring contacts are formed by hairpin valve springs.

16. The battery module in accordance with claim 15, wherein grooves are provided in the conductive spacer elements and wherein each hairpin valve spring has a projection at a limb that is held in a respective groove of the conductive spacer elements in order to provide the electrical contact between the electronic circuit board and the conductive spacer elements, at least in a supportive manner.

17. The battery module in accordance with claim 1 wherein the fire protective means are arranged at at least one side of each of the planar elements.

18. A battery module comprising battery cells and a cooling module having a plurality of tiers, wherein the tiers comprise stackable tier elements that are stacked on top of one another, and wherein a tier element comprises a first and second side part each defining a passage having a circumferentially closed cross section forming at least one flow passage through each first and second side part for the use of a liquid coolant, wherein each tier element further comprises a planar element which extends in a planar manner between the first and second side parts, wherein an inner space is formed between adjacent planar elements of different tiers, and wherein at least one of the battery cells is arranged in said space, the battery module further comprising fire-protective means, said fire-protective means being arranged between the planar element and the battery cell.

\* \* \* \* \*